United States Patent
Chase et al.

(10) Patent No.: US 11,804,141 B2
(45) Date of Patent: Oct. 31, 2023

(54) ROUTING BASED ON AERIAL VEHICLE CHARACTERISTICS

(71) Applicant: Joby Aero, Inc., Santa Cruz, CA (US)

(72) Inventors: Adam Thomas Chase, San Bruno, CA (US); Ian Andreas Villa, San Francisco, CA (US); Luke Asher Wilhelm, Sausalito, CA (US); Jon Petersen, Walnut Creek, CA (US); Robert Alan McDonald, San Luis Obispo, CA (US); Mark Douglass Moore, Henderson, NV (US); Celina Mikolajczak, San Carlos, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 23 days.

(21) Appl. No.: 16/894,264

(22) Filed: Jun. 5, 2020

(65) Prior Publication Data
US 2020/0388167 A1     Dec. 10, 2020

Related U.S. Application Data

(60) Provisional application No. 62/858,815, filed on Jun. 7, 2019.

(51) Int. Cl.
*G08G 5/00*     (2006.01)
*B64D 43/00*     (2006.01)
(Continued)

(52) U.S. Cl.
CPC ........... *G08G 5/0043* (2013.01); *B64D 43/00* (2013.01); *B64F 5/60* (2017.01); *G05D 1/0016* (2013.01);
(Continued)

(58) Field of Classification Search
CPC ......... B64F 5/60; B64D 43/00; G05D 1/0016; G05D 1/0027; G05D 1/104; G08G 5/0043
See application file for complete search history.

(56) References Cited

U.S. PATENT DOCUMENTS 7,640,098 B2 * 12/2009 Stenbock ............... G01C 21/00
340/995.1
9,792,576 B1 * 10/2017 Jamjoom ............... G05D 1/104
(Continued)

FOREIGN PATENT DOCUMENTS

WO     2019/089677 A1     5/2019
WO     WO 2019/089677     5/2019

OTHER PUBLICATIONS

Bianco, L., and Amedeo R. Odoni. Large Scale Computation and Information Processing in Air Traffic Control . 1st ed. 1993., Springer-Verlag, 1993, https://doi.org/10.1007/978-3-642-84980-0. (Year: 1993).*

(Continued)

*Primary Examiner* — Jonathan M Dager
*Assistant Examiner* — Aaron K McCullers
(74) *Attorney, Agent, or Firm* — Dority & Manning, P.A.

(57) ABSTRACT

Aerial vehicles are assigned to routes within a transportation network based on a state of charge, state of power, and/or state of health for the aerial vehicle. Such aspects can be modeled based on one or more statistical models and/or machine-learned models, among other examples. As another example, an energy budget is used to ensure that the state of charge, state of power, and/or state of health of the aerial vehicle during and/or after traveling the route remains within the energy budget. A payload is assigned to a route and an associated aerial vehicle, thereby generating an itinerary. In examples, the itinerary is validated by the aerial vehicle to ensure that the aerial vehicle is capable of (Continued)

traveling the route with the payload. In examples where the aerial vehicle rejects the itinerary, the itinerary is assigned to another aerial vehicle and a new itinerary is identified for the aerial vehicle.

20 Claims, 6 Drawing Sheets

(51) Int. Cl.
  *G05D 1/00* (2006.01)
  *B64F 5/60* (2017.01)
  *G05D 1/10* (2006.01)
  *G06Q 10/0631* (2023.01)
  *G06Q 10/047* (2023.01)
  *G06Q 10/0835* (2023.01)

(52) U.S. Cl.
  CPC .......... *G05D 1/0027* (2013.01); *G05D 1/104* (2013.01); *G06Q 10/047* (2013.01); *G06Q 10/0631* (2013.01); *G08G 5/0034* (2013.01); *G08G 5/0039* (2013.01); *G06Q 10/08355* (2013.01)

(56) References Cited

U.S. PATENT DOCUMENTS

| | | | |
|---|---|---|---|
| 9,858,823 B1* | 1/2018 | Lynn | G07C 5/0808 |
| 2009/0187449 A1* | 7/2009 | van Tulder | G06Q 10/06 705/7.17 |
| 2012/0056040 A1* | 3/2012 | Brotherton-Ratcliffe | B64C 27/20 244/75.1 |
| 2015/0325064 A1* | 11/2015 | Downey | B64C 39/024 701/29.3 |
| 2015/0336668 A1* | 11/2015 | Pasko | B64C 39/024 701/2 |
| 2017/0267343 A1 | 9/2017 | Chen et al. | |
| 2017/0286887 A1* | 10/2017 | Moran | B64C 39/024 |
| 2017/0323257 A1 | 11/2017 | Cheatham, III et al. | |
| 2018/0033314 A1* | 2/2018 | Boss | G08G 5/0039 |
| 2018/0061249 A1* | 3/2018 | Cui | G08G 5/0013 |
| 2018/0061251 A1* | 3/2018 | Venkatraman | G01C 21/20 |
| 2018/0075758 A1* | 3/2018 | Martinez | G08G 5/0052 |
| 2018/0102056 A1* | 4/2018 | Leber | G08G 5/0013 |
| 2018/0136651 A1* | 5/2018 | Levinson | G05D 1/0027 |
| 2018/0137454 A1* | 5/2018 | Kulkarni | G08G 5/0021 |
| 2018/0194469 A1* | 7/2018 | Evans | B64C 39/024 |
| 2018/0229859 A1* | 8/2018 | Evans | H02J 50/80 |
| 2018/0244384 A1* | 8/2018 | Phan | B64C 39/026 |
| 2018/0375568 A1* | 12/2018 | De Rosa | H04B 7/18506 |
| 2019/0047342 A1* | 2/2019 | Dietrich | B64C 39/02 |
| 2019/0080619 A1* | 3/2019 | Priest | G08G 5/0043 |
| 2019/0126769 A1 | 5/2019 | Schmalzried et al. | |

OTHER PUBLICATIONS

National, Research Council, et al. Flight to the Future : Human Factors in Air Traffic Control, edited by James P. McGee, et al., National Academies Press, 1997. ProQuest Ebook Central, https://ebookcentral.proquest.com/lib/usptl1/detail.action?docID=3375750. (Year: 1997).*

EUROCONTROL. 2015 Comparison of ATM-related performance: U.S.—Europe, Federal Aviation Administration, 2015. Air Traffic Plans and Publications, https://www.faa.gov/air_traffic/publications/ (Year: 2015).*

PCT International Search Report and Written Opinion in International Application PCT/US2020/036325, dated Sep. 16, 2020, 19 pages.

International Preliminary Report on Patentability for Application No. PCT/US2020/036325, dated Dec. 16, 2021, 10 pages.

* cited by examiner

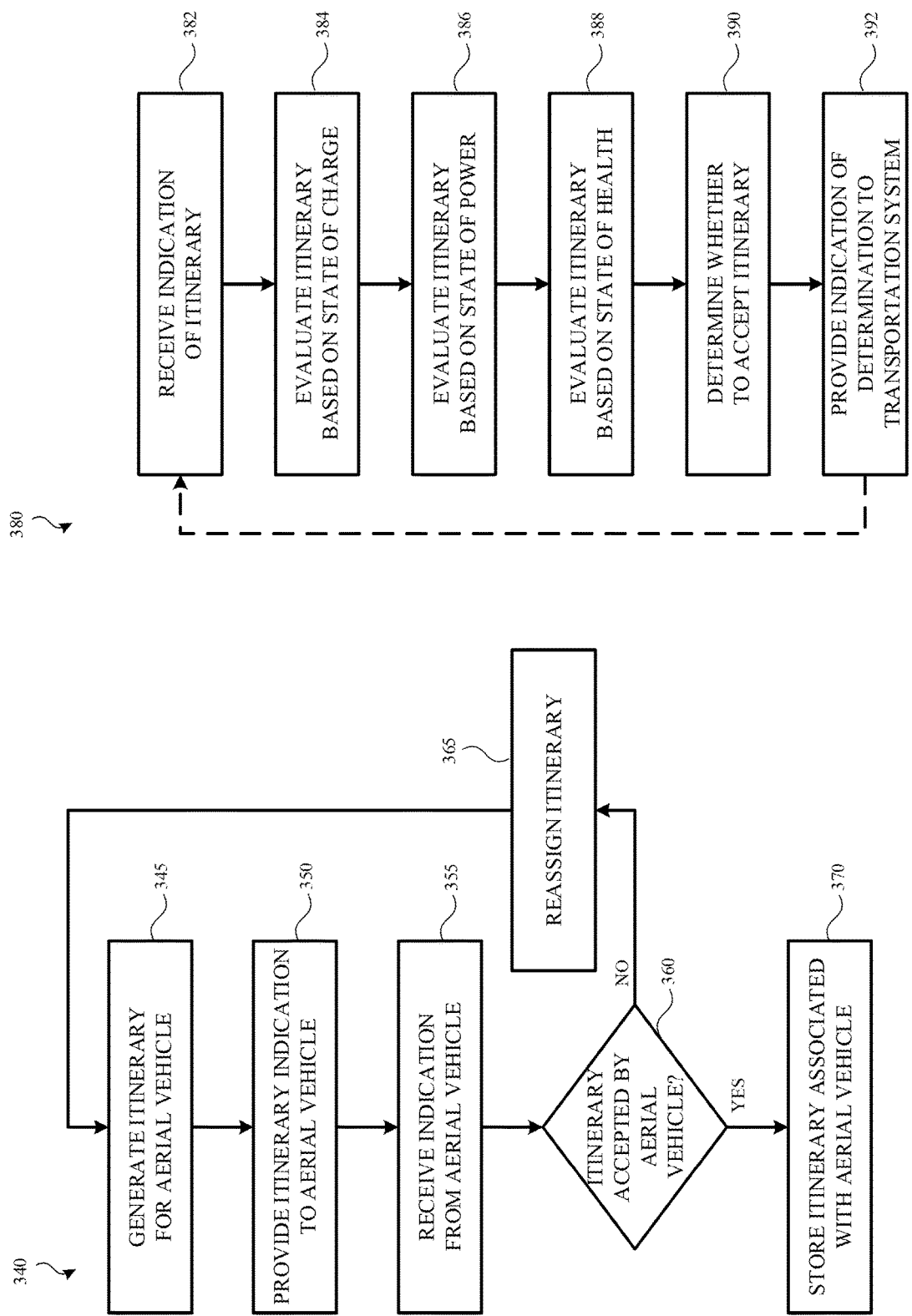

ROUTING BASED ON AERIAL VEHICLE CHARACTERISTICS

CROSS-REFERENCE TO RELATED APPLICATION

This application claims priority to U.S. Provisional Application No. 62/858,815, titled "Routing Based on Vehicle Characteristics," filed on Jun. 7, 2019, the entire disclosure of which is hereby incorporated by reference in its entirety.

BACKGROUND

A transportation service entity may use a fleet of aerial vehicles having different vehicle characteristics to transport payloads within a transportation network. As a result of differing vehicle characteristics, one aerial vehicle may be better-suited to operate a given route and/or transport a given payload as compared to another aerial vehicle. However, it is difficult to optimize aerial vehicle usage and payload routing within the transportation network in view of such considerations.

SUMMARY

Routes are generated within a transportation network in order to service expected demand within the transportation network. Each route comprises a starting vertiport and a destination vertiport. Aerial vehicles are assigned to routes based at least in part on an analysis of a state of charge, state of power, and/or state of health for the aerial vehicle. In examples, such aspects are modeled based on one or more statistical models and/or machine-learned models, among other examples. An aerial vehicle may be assigned multiple routes, where the expected state of charge, state of power, and/or state of health for the aerial vehicle after traveling one route is sufficient to travel the subsequent route (e.g., with or without recharging or refueling between routes). In other examples, an aerial vehicle is assigned a route without an associated payload, thereby positioning the aerial vehicle at a different starting vertiport for subsequent routes. As another example, an energy budget is used, where routes are assigned to the aerial vehicle in view of the energy budget so as to ensure that the state of charge, state of power, and/or state of health for the aerial vehicle remains within the energy budget.

A payload is assigned to a route and an associated aerial vehicle, thereby generating an itinerary. In examples, the itinerary is validated by the aerial vehicle (e.g., automatically, based at least in part on a manual indication by a pilot, flight attendant, or other provider) in order to ensure that the aerial vehicle is capable of traveling the route with the assigned payload. In examples where the aerial vehicle rejects the itinerary, the itinerary is assigned to another aerial vehicle and a new itinerary is identified. In other examples, where the actual state of charge, state of power, and/or state of health of an aerial vehicle differs from the expected characteristics of the aerial vehicle during or after traveling a route, one or more subsequent routes associated with the aerial vehicle are reassigned within the transportation network. As another example, the aerial vehicle is rerouted to a different destination vertiport and, if necessary, a new or updated itinerary is generated for a payload thereon.

BRIEF DESCRIPTION OF THE DRAWINGS

FIG. 3B illustrates an example method for assigning an itinerary to an aerial vehicle.

FIG. 3C illustrates an example method for validating an itinerary at an aerial vehicle.

DETAILED DESCRIPTION

Figure 1:
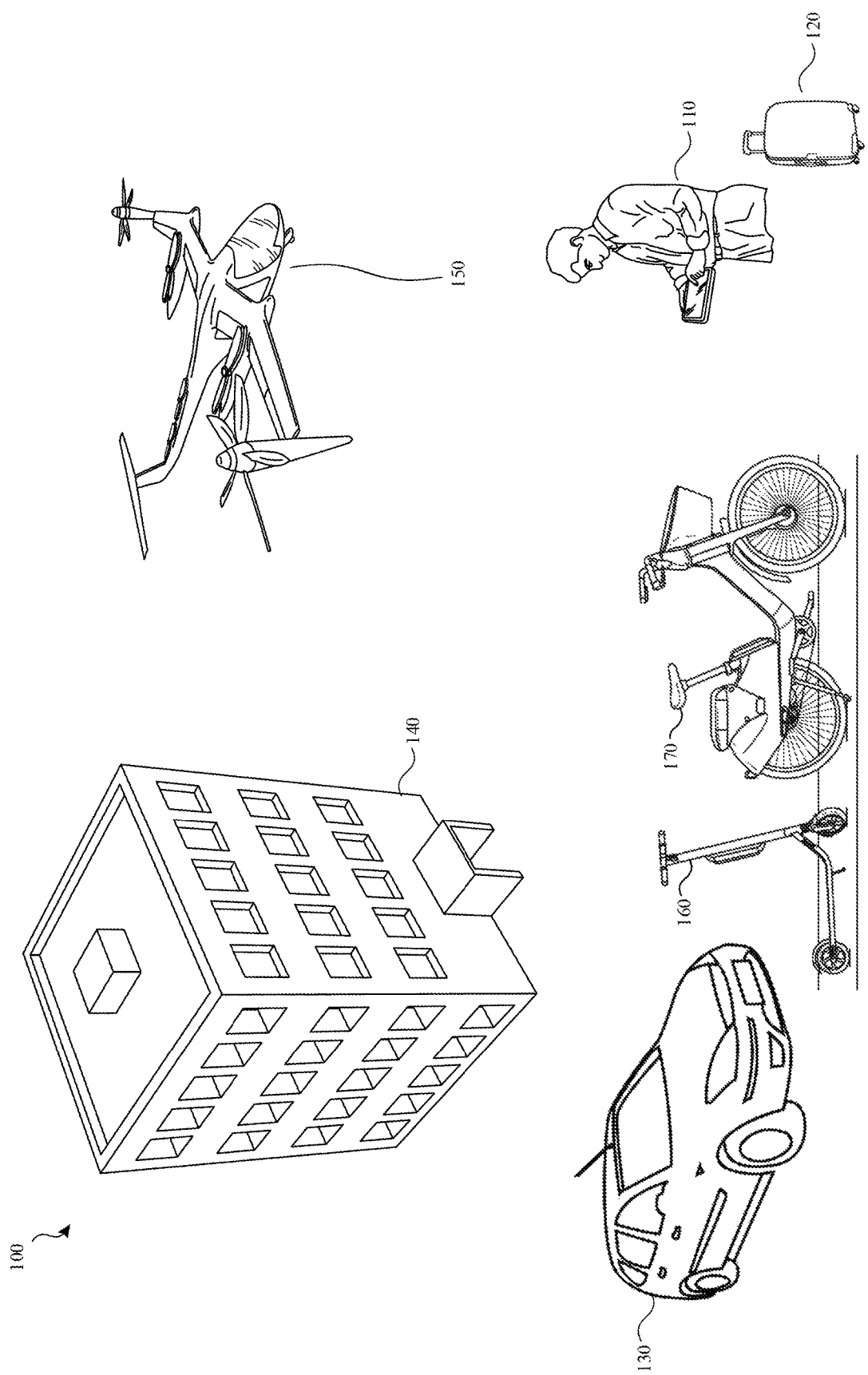
FIG. 1 illustrates an example multimodal transportation system in which payloads are routed according to aspects described herein.

A transportation service entity may use a fleet of aerial vehicles having differing vehicle characteristics to transport payloads within a transportation network. For example, an aerial vehicle may use any of a variety of energy types (e.g., hydrocarbon fuel, electric power, hybrid technologies, etc.). Additionally, there may be variability among the different energy types, including, but not limited to diesel fuel versus ethanol fuel or lithium-ion batteries versus lithium polymer batteries, among other examples. It will be appreciated that other vehicle characteristics may vary among a fleet of aerial vehicles, including, but not limited to, the hardware of an aerial vehicle (e.g., number of engines/electric motors, seating or cargo capacity, wingspan, etc.), capabilities of the aerial vehicle (e.g., vertical takeoff, vertical landing, etc.), and vehicle weight/carrying capacity.

In examples, characteristics of an aerial vehicle are received from a manufacturer and stored in a vehicle information data store. For example, the vehicle information data store comprises general characteristics relating to a model of aerial vehicle (e.g., vehicle manufacturer, vehicle make, as-manufactured fuel/charge capacity, maximum payload capacity, etc.). In other examples, the vehicle information data store comprises vehicle-specific characteristics (e.g., current fuel/charge capacity, when a vehicle was last maintained, a maintenance schedule, etc.). For example, specific aerial vehicles of the same vehicle type may have different characteristics or characteristics may change over the life of the vehicle.

An aerial vehicle with a particular energy type may have or otherwise be associated with a state of charge. As used herein, a "state of charge" of an aerial vehicle represents the energy that is currently available to the aerial vehicle. Given aerial vehicles have varying characteristics, determining the state of charge for an aerial vehicle may depend on such characteristics. For example, the state of charge represents an amount of energy (e.g., watt hours, voltage, etc.) available for the aerial vehicle. Depending on the energy type of the aerial vehicle, the state of charge is determined based on the charge of one or more rechargeable batteries, an amount of fuel remaining in a fuel tank, or a combination thereof. The state of charge affects the distance that the aerial vehicle is capable of traveling. The state of charge also affects a maximum payload weight the aerial vehicle is able to carry with respect to distance.

An aerial vehicle may also have or otherwise be associated with a state of health. The "state of health" of an aerial vehicle represents the ability of an aerial vehicle to store or use energy to complete a route. For example, the battery capacity of the rechargeable battery of an electric or hybrid aerial vehicle may diminish over time. As a result, the aerial vehicle will have a decreased range and the ability to carry heavier payloads will be diminished. It will be appreciated that a hydrocarbon-based aerial vehicle may also experience a diminishing state of health over time, as a result of mechanical degradation of the aerial vehicle's engine and other components. Another example of a diminished state of health is the gradually increasing weight of an aerial vehicle over its lifetime. Thus, it will be appreciated that the aspects of an aerial vehicle used to determine its state of health vary based on the characteristics of the aerial vehicle, including, but not limited to, energy type, hardware of the aerial vehicle, and vehicle weight, among other examples.

An aerial vehicle may also have or otherwise be associated with a state of power. A "state of power" for an aerial vehicle represents the lift capacity, thereby indicating a maximum payload weight that the aerial vehicle is capable of carrying (e.g., while taking off, while climbing to a target altitude, etc.). Thus, state of power describes peak energy available (e.g., current available from one or more battery cells, horsepower and/or torque output, etc.). Example factors for determining state of power include, but are not limited to, open circuit voltage and/or internal resistance of one or more battery cells, a duration for which the peak power is available (e.g., before current begins to drop off, before a temperature threshold is reached, etc.), state of health, state of charge, and/or temperature (e.g., ambient air temperature, an operating temperature of the aerial vehicle, etc.). It will be appreciated that different algorithms may be used to determine a state of power for different aerial vehicle types. For example, an all-electric aerial vehicle may use a different algorithm than a hybrid or strictly hydrocarbon-powered vehicle.

As a result of such varying vehicle characteristics, it may be beneficial to evaluate vehicle characteristics when determining which aerial vehicle to use (e.g., for transporting passengers). This evaluation may be useful when generating a route for the determined aerial vehicle to travel (e.g., to transport user(s) from one location to another). For example, a hydrocarbon-powered or hybrid aerial vehicle may exhibit greater range, and may therefore be a better candidate for traveling a longer route. As another example, an electric aerial vehicle exhibiting a decreased state of health may be a better candidate for a series of short trips as compared to an electric aerial vehicle with a comparatively better state of health. As a result of the decreased state of health, recharging the depleted battery after a farther trip may take longer as compared to the electric aerial vehicle having the better state of health. As a result, the vehicle may be grounded for a longer period time. Given that the state of power for an electric aerial vehicle decreases with a decreasing state of health, an electric aerial vehicle with a high state of health may be used to transport heavier payloads as compared to an electric aerial vehicle with a low state of health. Rather, the electric aerial vehicle with a low state of health may not have a sufficient state of power to adequately maneuver with heavier payloads.

The state of health, state of charge, and state of power for an aerial vehicle is communicated by the aerial vehicle to the transportation system. As an example, the aerial vehicle comprises a vehicle state monitor that collects information from a variety of sensors and controllers of the aerial vehicle. For example, a fuel sensor and/or battery charge sensor are used to determine the state of charge of the vehicle. As another example, a state of health controller monitors engine oil life, estimated or measured aerial vehicle weight, and scheduled required maintenance, among other examples. A state of power controller may monitor peak lift capacity, maximum current available from one or more batteries, and/or engine efficiency, among other examples. The vehicle state monitor may communicate the state of health, state of charge, and state of power at regular intervals, in response to a request from the transportation system, and/or upon the occurrence of certain events (e.g., upon departing from or arriving at a vertiport, as a result of reaching a certain state of charge, based on determining estimated vehicle performance has deviated from actual vehicle performance beyond a predetermined threshold, etc.).

An aerial vehicle travels between vertiports. As used herein, a vertiport is a location at which an aerial vehicle arrives, departs, refuels/recharges, and/or is maintained, among other examples. Vertiports may be located at ground level, above ground level, or below ground level. A vertiport may have various associated capabilities, including, but not limited to, the ability to charge an electric or a hybrid aerial vehicle, the ability to refuel a hydrocarbon-based or hybrid aerial vehicle, and the ability to perform different types of vehicle maintenance. Thus, given the variability of vertiports within the transportation network, it may also be beneficial to evaluate such vertiport capabilities when determining an aerial vehicle and generating a route for an aerial vehicle. In some instances, vertiport capabilities are evaluated in combination with vehicle characteristics.

Vertiport capabilities of vertiports within a transportation network may be stored using a vertiport information data store. For example, the vertiport information data store comprises capabilities relating to a type of vertiport (e.g., a vertiport co-located with a commercial airport, a refueling vertiport, a recharging vertiport, etc.) and/or vertiport-specific information. In some examples, the vertiport information data store further comprises historical demand information, which may be used to forecast future demand at a given vertiport, as well as between pairs of vertiports.

It will be appreciated that a payload transported by an aerial vehicle according to aspects described herein may comprise one or more riders, baggage, cargo, food, or any combination thereof, among other examples. Payload characteristics include, but are not limited to, a payload weight, a payload volume, a number of riders in a payload, a pick-up location, a drop-off location, and/or a distance to travel. In examples, demand information for a vertiport or pair of vertiports is further categorized based on payload type. In order to transport the payload, the aerial vehicle may travel between a set of vertiports in the transportation network. In some instances, a payload is transported to or from a vertiport (e.g., prior to or after transportation via the aerial vehicle) via another mode of transportation, including, but not limited to, an automotive vehicle, a scooter, or a bicycle, among other examples. In other instances, a payload may be transported between a series of nodes in the transportation network, wherein the same aerial vehicle or multiple aerial vehicles are used to transport the payload accordingly.

In examples, the transportation system provides an application programming interface (API). The API is used to register an aerial vehicle with the transportation system. The API may be used to indicate that the aerial vehicle is active within the transportation network and when the aerial vehicle is available to transport payloads. For example, an aerial vehicle uses the API to indicate it is available to transport payloads (e.g., once it is powered on, once it has left a predetermined location, etc.). As another example, a computing device (e.g., as may be used by an owner of the aerial vehicle, an operator of the aerial vehicle, etc.) may use the API to indicate the aerial vehicle is available to transport payloads. In some examples, the API is used to provide aerial vehicle information to the transportation system, including, but not limited to, the energy type of the aerial vehicle, a state of health, a state of charge, a state of power, current payload weight, and/or available payload capacity. The aerial vehicle information may be provided by a vehicle manufacturer, an owner/operator of the aerial vehicle, and/or the aerial vehicle itself, among other examples. In examples, the transportation system stores vehicle information received using the API in a vehicle information data store, as described above.

Thus, the present disclosure describes systems and methods for aerial vehicle selection and route determination in order to generate an itinerary for transporting a payload between vertiports within a transportation network. In examples, available vertiports from which to depart and at which to arrive are evaluated either alone or in combination with vehicle characteristics. Demand information (e.g., as may be stored by a vehicle information data store) is processed to generate routes within the transportation network, thereby servicing projected demand for transporting payloads between vertiports of the transportation network (e.g., as may be modeled according to historical observations and/or upcoming events, among other examples). A route comprises a departure vertiport and an arrival vertiport, which may be referred to as a vertiport pair. The route may be associated with a time or times, which are determined based on the demand information. In examples, the route further comprises information relating to historical and/or projected demand for one or more expected payload categories (e.g., riders, baggage, cargo, food, etc.). Aerial vehicles to transport payloads among the generated routes are then determined as described herein. In another example, an aerial vehicle may travel a route without transporting a payload (e.g., "deadheading"). In examples, such a route is used to position the aerial vehicle at a destination vertiport in anticipation of predicted demand, to perform vehicle maintenance, to refuel/recharge the aerial vehicle according to specific vehicle characteristics, etc.

In examples, an aerial vehicle is associated with a set of generated routes. The set of routes is determined based on evaluating an aerial vehicle using one or more models (e.g., statistical model, machine-learned model, etc.) in view of available routes (e.g., as may be generated according to the aspects described above). For example, models relating to aerial vehicle energy type, state of charge, state of health, and/or state of power, among other vehicle characteristics, may be evaluated to generate predicted vehicle characteristics. In examples, a statistical model is specific to a type of aerial vehicle, wherein data for a set of aerial vehicles of a given type is processed to generate the type-specific model. Vehicle information used for such evaluations may be accessed from a vehicle information data store, as described above.

The evaluation further comprises evaluating route distance, vertiport capabilities, and payload demand information based on the modeled vehicle characteristics in order to select an aerial vehicle that is capable of traveling the route carrying a projected payload. The set of routes may comprise one or more additional routes to position an aerial vehicle at a predetermined vertiport after the aerial vehicle completes the set of routes. For example, the predetermined vertiport may be a vertiport at which the aerial vehicle can recharge/refuel, or it may be a vertiport at which the aerial vehicle is expected to begin a new set of generated routes.

In some examples, the state of charge and/or state of power of an aerial vehicle is evaluated so as to maintain an energy budget. For example, an energy budget can include a state of charge threshold, such that the state of charge of the aerial vehicle is maintained above the threshold. As another example, the energy budget includes a state of power threshold, such that the state of power for the vehicle does not drop below the state of power threshold. Thus, a route may be selected so as to leave the aerial vehicle with a predetermined state of charge and/or state of power upon arrival at the destination vertiport. The threshold may be determined based on subsequent routes assigned to the aerial vehicle (e.g., thereby ensuring the aerial vehicle has sufficient energy to complete the subsequent routes) and/or based on a minimum energy requirement in order to ensure the aerial vehicle is able to refuel at a given vertiport, among other examples.

Aerial vehicle route assignments may be changed as a result of vehicle characteristics diverging from modeled characteristics while traveling a route or as a result of unexpected demand, among other examples. For example, an aerial vehicle may be assigned to a first route followed by a second route. However, adverse weather conditions may negatively affect the state of charge of the vehicle, such that the vehicle no longer has sufficient energy to travel the second route. Accordingly, the second route may be reassigned to a different aerial vehicle and the first aerial vehicle may be reassigned to a different route within the transportation network that the vehicle is capable of traveling in view of its updated vehicle characteristics. In another example, the aerial vehicle is routed to a new vertiport after completing the first route. For example, there may not be any suitable routes as a result of the decreased state of charge. The new vertiport may enable the aerial vehicle to charge/refuel, pick up a payload that is better-suited for its current state of charge, or travel a route for which it is better-suited. Thus, an aerial vehicle is assigned to one or more routes in order to optimize or otherwise improve one or more conditions, including, but not limited to, travel time, distance traveled, charge/refueling time, energy constraints, state of charge constraints, state of power constraints, and/or aerial vehicle downtime.

An itinerary to transport a payload within the transportation network is generated. The itinerary comprises one or more routes and associated aerial vehicles. In examples, a pre-existing route with which to transport the payload is determined based on payload characteristics, route distance, route duration, and expected or actual demand for the route. Given the route is pre-existing, an aerial vehicle may already be associated with route, such that the determination further comprises evaluating payload characteristics based on vehicle characteristics. For example, the evaluation comprises evaluating a payload weight as compared to the state of charge, state of health, and/or state of power for the aerial vehicle. In some examples, the itinerary is generated in response to a received itinerary request. An itinerary request may be received from a computing device, and may comprise at least a starting location and a destination location for a payload. It will be appreciated that the starting location and the destination location need not each be vertiports and that, in some examples, multiple modes of transportation are used as described above.

In other examples, rather than using a pre-existing route, a new route is generated for the payload. For example, the pre-existing route may not have capacity for the payload (e.g., due to volume restrictions, weight restrictions, etc.) or there may not be an existing route to transport the payload toward its destination. In such examples, the route may be generated based on predicted or actual demand information and a pick-up/drop-off location for the payload. For example, if additional payloads share a similar pick-up/drop-off location, the new route is generated to accommodate such payloads. As described above, generating the route comprises selecting a departure vertiport and an arrival vertiport for the payload accordingly. An aerial vehicle is determined and associated with the route, wherein the aerial vehicle is selected based on an evaluation of payload characteristics and vehicle characteristics. Returning to the example above having multiple payloads, the evaluation may further comprise evaluating characteristics for each of the additional payloads in view of the vehicle characteristics. It will be appreciated that the aerial vehicle may be at-capacity while, in other examples, excess capacity may exist depending on current demand or a planned future route for the aerial vehicle, among other examples.

FIG. 1 illustrates an example multimodal transportation system 100 in which payloads are routed according to aspects described herein. Multimodal transportation system 100 is illustrated as comprising rider 110, baggage 120, vertiport 140, aerial vehicle 150, and ground vehicles 130, 160, and 170. Aerial vehicle 150 and ground vehicles 130, 160, and 170 are provided as example modes of transportation that are used to transport one or more payloads (e.g., rider 110 and baggage 120) within the multimodal transportation network. It will be appreciated that any of a variety of additional or alternative modes of transportation may be used without departing from the present disclosure. Similarly, multimodal transportation system 100 is illustrated as comprising rider 110 and baggage 120 as example payloads. Additional or alternative payloads may be used according to other aspects of the present disclosure, including, but not limited to, cargo or food.

In examples, payloads 110 and 120 are at a starting location for transport to a destination location. In some instances, the starting location may be vertiport 140 at which aerial vehicle 150 is located, such that payloads 110 and 120 are transported to the destination location at least in part using aerial vehicle 150. In other examples, the starting location is not vertiport 140. In such instances, another mode of transportation is used to transport payloads 110 and 120 to vertiport 140 in order to route payloads 110 and 120 to the destination location using aerial vehicle 150. For example, one or more of ground vehicles 130, 160, and/or 170 may be used. Similarly, a destination vertiport at which aerial vehicle 150 lands may be the destination location of payloads 110 and 120. However, in other examples where the destination vertiport is not the destination location, one or more other modes of transportation may be used to transport payloads 110 and 120 from the destination vertiport to the destination location.

Further, while multimodal transportation system 100 is described with respect to a single aerial vehicle 150 traveling from a starting vertiport 140 to a destination vertiport, it will be appreciated that, in other examples, additional vertiports and/or aerial vehicles are used to transport payloads accordingly. For example, an intermediate vertiport may be used to refuel/recharge aerial vehicle 150 or, as another example, payloads 110 and 120 may leave aerial vehicle 150 and board another aerial vehicle to continue on to the destination location. As another example, payloads 110 and 120 may leave aerial vehicle 150 at a first intermediate vertiport, travel to a second intermediate vertiport using one or more different transportation modes, and board another aerial vehicle at the second intermediate vertiport to continue on to the destination location. Thus, a payload need not only travel within the transportation network from a starting vertiport to a destination vertiport and may instead by routed from a starting location to a destination location using any of a variety of transportation modes, intermediate stops, and vehicles.

Rider 110 uses a client device to specify a starting location and a destination location. As illustrated, rider 110 uses a tablet computing device, but it will be appreciated any of a variety of other computing devices may be used. In examples, automotive vehicle 130 is assigned to transport rider 110 and baggage 120 from the starting location to vertiport 140. In other examples, rider 110 uses the client device to identify a nearby vehicle, such as one of vehicles 160 and 170. Rider 110 may then "unlock" vehicle 160 or 170 to use the vehicle accordingly. In some instances, rider 110 may travel to vertiport 140 using one mode of transportation (e.g., vehicle 160 or 170), while baggage 120 may be transported to vertiport 140 using another mode of transportation (e.g., automotive vehicle 130).

Vertiport 140 is a location at which aerial vehicles (e.g., aerial vehicle 150) arrive, depart, refuel/recharge, and/or are maintained, among other examples. Thus, vertiport 140 may have any of a variety of associated capabilities, including, but not limited to, the ability to charge and/or refuel aerial vehicle 150 and the ability to perform different types of vehicle maintenance. Vertiport 140 may be located at ground level, above ground level, or below ground level. It will be appreciated that while multimodal transportation system 100 is illustrated as comprising one aerial vehicle 150, any number of aerial vehicles may use capabilities associated with vertiport 140. Returning to the above example, payloads 110 and 120 may start at vertiport 140 or may arrive at vertiport 140 for transportation via aerial vehicle 150 (e.g., after transportation by another aerial vehicle, via ground vehicles 130, 160, and/or 170, etc.).

Aerial vehicle 150 may be an electric aerial vehicle, a hybrid aerial vehicle, or a hydrocarbon-based aerial vehicle, among other examples. According to aspects described herein, aerial vehicle 150 has a variety of associated vehicle characteristics, including, but not limited to, a vehicle manufacturer, a vehicle make, an as-manufactured fuel/charge capacity, a current fuel/charge capacity, a maximum payload capacity, a date/time for when the aerial vehicle was last maintained, and/or a maintenance schedule. Such characteristics may be stored in a vehicle information data store associated with multimodal transportation system 100 and may be used to route payloads using aerial vehicle 150 according to payload characteristics associated with the payload.

In examples, aerial vehicle 150 further comprises a vehicle state monitor, which determines a state of health, state of charge, and/or state of power for aerial vehicle 150. Such information is communicated to multimodal transportation system 100 and used for routing payloads according to aspects described herein. For example, the vehicle state monitor may communicate the state of health, state of charge, and state of power of aerial vehicle 150 at regular intervals, in response to a request from multimodal transportation system 100, and/or upon the occurrence of certain events (e.g., upon departing from or arriving at vertiport 140, as a result of reaching a certain state of charge, based on determining estimated vehicle performance has deviated from actual vehicle performance beyond a predetermined threshold, etc.).

Figure 2:
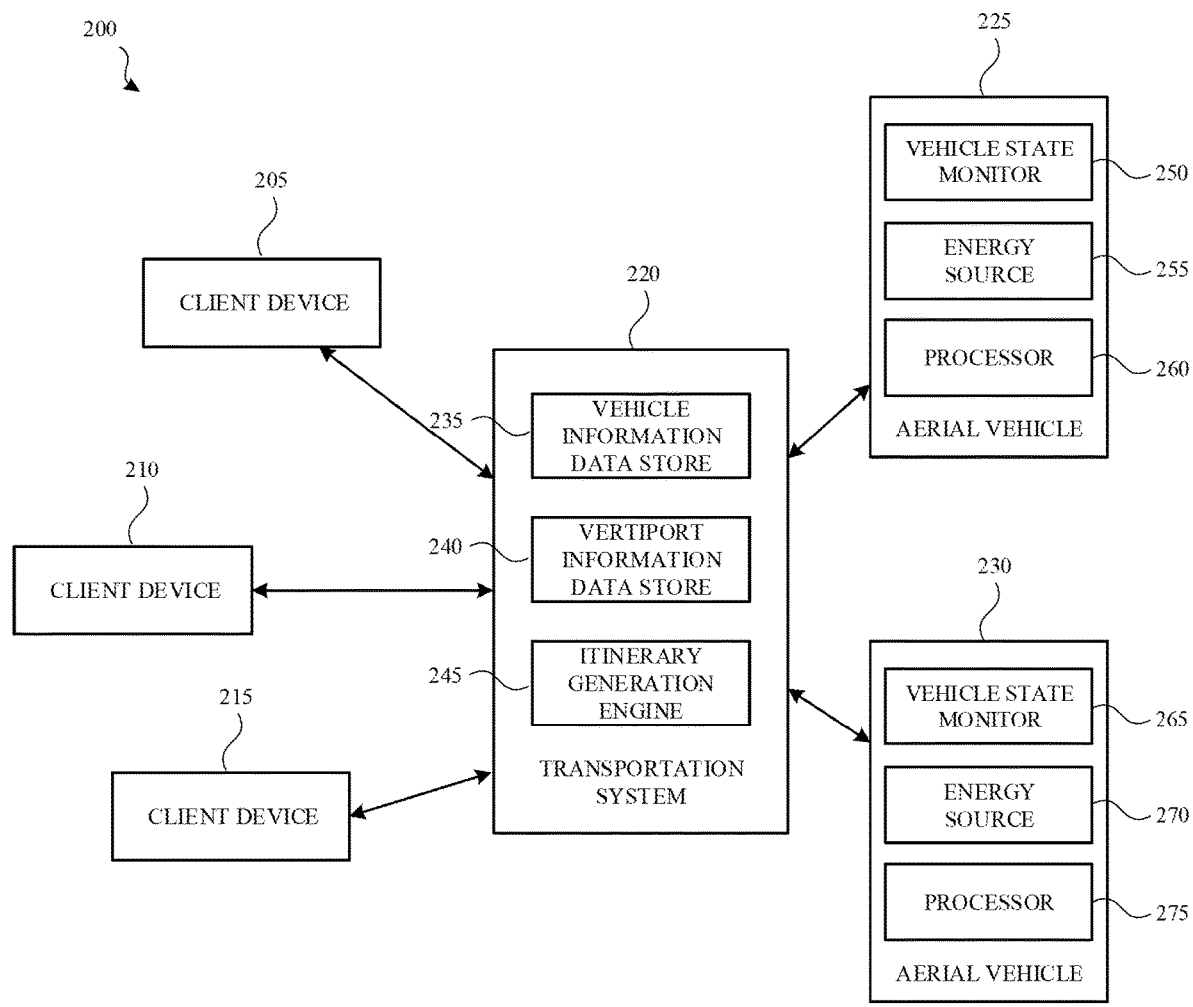
FIG. 2 illustrates an example system for routing payloads using aerial vehicles of a transportation service entity.

FIG. 2 illustrates an example system 200 for routing payloads using aerial vehicles of a transportation service entity. In examples, aspects of system 200 are used to route payloads within a multimodal transportation network, such as multimodal transportation system 100 discussed above with respect to FIG. 1. As illustrated, system 200 comprises client devices 205, 210, and 215, transportation system 220, and aerial vehicles 225 and 230. In an example, each of client devices 205, 210, and 215 are any of a variety of computing devices, including, but not limited to, a mobile computing device, a laptop computing device, a tablet computing device, or a desktop computing device.

For example, client device 205 may comprise a rider application with which a rider identifies and/or unlocks a vehicle (e.g., vehicles 160 or 170 in FIG. 1), requests a ride from a provider (e.g., that operates an automotive vehicle such as automotive vehicle 130), and/or schedules a trip via an aerial vehicle (e.g., aerial vehicle 150). Thus, the rider application on client device 205 communicates with transportation system 220 (e.g., using an API) to provide an itinerary request, thereby receiving an itinerary to transport a payload (e.g., comprising the rider, baggage, and/or cargo, etc.) from a starting location to a destination location.

As another example, client device 210 comprises a provider application that a provider operating an automotive vehicle uses to indicate availability to service demand within the transportation network and to accept requests for transporting one or more payloads, among other actions. In other instances, client device 215 comprises a provider application used by a provider operating an aerial vehicle (e.g., a pilot, a flight attendant, etc.). The provider application may enable the provider to input information, including, but not limited to, an unloaded vehicle payload capacity, remaining vehicle payload capacity, and/or one or more serviced geographical areas. In other instances, the provider application automatically gathers information, such as a location of the client device or an elevation of the client device, among other examples. Similar to the rider application, the provider application may communicate with transportation system 220 using an API. While example functionality is described with respect to a distinct rider application and a distinct provider application, such functionality may be combined into a single application or may be distributed among any number of other applications in other examples.

Aerial vehicle 225 comprises vehicle state monitor 250, energy source 255, and processor 260. Energy source 255 may be any of a variety of energy sources according to aspects described herein, including, but not limited to, hydrocarbon fuel, one or more battery cells or other source of electric power, or any combination thereof. In examples, vehicle state monitor 250 collects information from a variety of sensors and controllers of aerial vehicle 225. For example, vehicle state monitor 250 determines a state of charge of energy source 255 (e.g., using a fuel sensor and/or battery charge sensor). As another example, vehicle state monitor 250 monitors engine oil life, estimated or measured aerial vehicle weight, and scheduled required maintenance, among other examples. Vehicle state monitor 250 may monitor aspects relating to state of power for aerial vehicle 225 (e.g., peak lift capacity, maximum current available from one or more batteries, and/or engine efficiency, etc.).

Processor 260 communicates information collected by vehicle state monitor 250 to transportation system 220. For example, processor 260 communicates the state of health, state of charge, and/or state of power of aerial vehicle 225 at regular intervals, in response to a request from transportation system 220, and/or upon the occurrence of certain events (e.g., upon departing from or arriving at a vertiport, as a result of reaching a certain state of charge, based on determining estimated vehicle performance has deviated from actual vehicle performance beyond a predetermined threshold, etc.).

In examples, processor 260 receives an itinerary from transportation system 220. As described above, the itinerary may comprise a route from a starting vertiport to a destination vertiport, as well as an indication of a payload to be transported between the two vertiports. Accordingly, processor 260 processes the received itinerary to validate that aerial vehicle 225 is capable of performing the itinerary. As an example, processor 260 evaluates power and/or energy requirements associated with the itinerary as compared to the state of charge and/or state of power of aerial vehicle 225, respectively.

In some examples, processor 260 generates one or more vehicle status indications relating to aerial vehicle 225 that are provided to a provider that operates aerial vehicle 225 (e.g., state of charge, state of power, state of health, etc.). Such vehicle status indications may be provided via a display within aerial vehicle 225 and/or via a provider application, among other examples. For example, a vehicle status indication may be a recommendation to accept an itinerary, reject an itinerary, a set of vehicle characteristics, or any combination thereof, among other examples. The provider may use a vehicle status indication to determine whether aerial vehicle 225 is suited to perform the itinerary, after which the provider provides an indication to processor 260 to accept or reject the itinerary.

Thus, it will be appreciated that, in some examples, the validation process is performed automatically while, in other examples, human interaction is received as at least a part of the validation process. Based on the validation process, processor 260 provides an indication to transportation system 220 as to whether the itinerary is accepted or rejected. In examples where the itinerary is rejected, another itinerary may be received from transportation system 220, which is validated according to aspects described herein. In other examples, transportation system 220 may validate an itinerary for aerial vehicle 225 in order to accept or reject an itinerary on behalf of aerial vehicle 225 either in addition to or as an alternative to the validation techniques performed by processor 260. Thus, it will be appreciated that validation need not be performed exclusively by an aerial vehicle.

Aerial vehicle 230 comprises vehicle state monitor 265, energy source 270, and processor 275. Such aspects are similar to vehicle state monitor 250, energy source 255, and processor 260 of aerial vehicle 225 and are therefore not re-described in detail below. In examples, an itinerary is assigned to aerial vehicle 225 by transportation system 220, such that it is validated by processor 260 according to aspects described herein (e.g., based on a state of charge, state of power, and/or state of health determined by vehicle state monitor 250). In some instances, processor 260 determines that aerial vehicle 225 is not suited to perform the itinerary (e.g., based on a payload weight exceeding that which is serviceable by the state of power, based on a route distance exceeding the state of charge for aerial vehicle 225, etc.).

In such instances, processor 260 provides a rejection indication to transportation system 220, after which the rejected itinerary is reassigned. For example, the rejected itinerary may be reassigned to aerial vehicle 230. Similar to aerial vehicle 225, processor 275 of aerial vehicle 230 evaluates the itinerary as described above to validate that aerial vehicle 230 is capable of performing the assigned itinerary. Thus, if processor 275 successfully validates the itinerary, processor 275 provides an acceptance indication to transportation system 220. However, if the itinerary is not validated, a rejection indication is provided to transportation system 220 instead.

Transportation system 220 is illustrated as comprising vehicle information data store 235, vertiport information data store 240, and itinerary generation engine 245. Vehicle information data store 235 stores any of a variety of vehicle information (e.g., relating to aerial vehicles 225 and 230), including, but not limited to, general characteristics relating to a model of aerial vehicle (e.g., vehicle manufacturer, vehicle make, as-manufactured fuel/charge capacity, maximum payload capacity, etc.). In other examples, vehicle information data store 235 comprises vehicle-specific characteristics for aerial vehicle 225 and/or aerial vehicle 230 (e.g., current fuel/charge capacity, when a vehicle was last maintained, a maintenance schedule, etc.).

Thus, it will be appreciated that vehicle information stored by vehicle information data store 235 may come from any of a variety of sources. As an example, general characteristics relating to an aerial vehicle model may be provided by or otherwise accessed from one or more manufacturers associated with the aerial vehicle model, while vehicle-specific characteristics may be collected or otherwise received from an aerial vehicle according to aspects described herein (e.g., from processor 260 and vehicle state monitor 250 of aerial vehicle 225 and/or processor 275 and vehicle state monitor 265 of aerial vehicle 230). As another information, transportation system 220 may generate vehicle information stored by vehicle information data store 235. For example, vehicle information data store 235 may store a percentage of itineraries accepted/rejected for a given aerial vehicle, as well as metrics relating to the accuracy of predicted vehicle characteristics as compared to actual vehicle characteristics (e.g., modeled state of charge versus reported state of charge, modeled state of power versus reported state of power, modeled state of health versus reported state of health, etc.).

Transportation system 220 is further illustrated as comprising vertiport information data store 240 that stores information relating to vertiports of the transportation network (e.g., vertiport 140 in FIG. 1). For example, vertiport information data store 240 comprises capabilities relating to a type of vertiport (e.g., a vertiport co-located with a commercial airport, a refueling vertiport, a recharging vertiport, etc.) and/or vertiport-specific information (e.g., whether a vertiport is located at ground level, above ground level, or below ground level, a number of aerial vehicles that can be at the vertiport at a given time, etc.). In some examples, vertiport information data store 240 further comprises historical demand information, which may be used to forecast future demand at a given vertiport, as well as between pairs of vertiports.

Itinerary generation engine 245 of transportation system 220 generates routes, assigns aerial vehicles to the generated routes, and generates itineraries to transport payloads using the routes and associated aerial vehicles according to aspects described herein. As an example, itinerary generation engine 245 may access demand information from vertiport information data store 240 and may process the demand information to generate routes between vertiports of the transportation network. For example, demand may be modeled according to historical observations and/or upcoming events (e.g., as may be stored by vertiport information data store 240), among other examples in order to service projected demand for transporting payloads between the vertiports of the transportation network. A route generated by itinerary generation engine 245 comprises a departure vertiport and an arrival vertiport, which may be referred to as a vertiport pair. The generated route may be associated with a time or times, which are determined based on the demand information. In examples, the route further comprises information relating to historical and/or projected demand for one or more expected payload categories (e.g., riders, baggage, cargo, food, etc.).

Accordingly, itinerary generation engine 245 associates an aerial vehicle (e.g., aerial vehicle 225 or aerial vehicle 230) with a set of generated routes. The set of routes is determined based on evaluating a given aerial vehicle using one or more models (e.g., statistical model, machine-learned model, etc.) in view of the available routes. For example, models relating to aerial vehicle energy type, state of charge, state of health, and/or state of power, among other vehicle characteristics, may be evaluated to generate predicted vehicle characteristics. In examples, a statistical model is specific to a type of aerial vehicle, wherein data for a set of aerial vehicles of a given type is processed to generate the type-specific model.

In some examples, itinerary generation engine 245 evaluates the state of charge and/or state of power of an aerial vehicle so as to maintain an energy budget for the aerial vehicle. For example, an energy budget can include a state of charge threshold, such that the state of charge of the aerial vehicle is maintained above the threshold. As another example, the energy budget includes a state of power threshold, such that the state of power for the vehicle does not drop below the state of power threshold. Thus, itinerary generation engine 245 may select a route so as to leave the aerial vehicle with a predetermined state of charge and/or state of power upon arrival at a destination vertiport. For example, the threshold may be determined based on subsequent routes assigned to the aerial vehicle (e.g., thereby ensuring the aerial vehicle has sufficient energy to complete the subsequent routes) and/or based on a minimum energy requirement in order to ensure the aerial vehicle is able to refuel at a given vertiport, among other examples. Vehicle information for a given aerial vehicle used for such evaluations is accessed from vehicle information data store 235.

In some examples, the evaluation performed by itinerary generation engine 245 further comprises evaluating a route distance, vertiport capabilities, and payload demand information based on the modeled vehicle characteristics in order to select an aerial vehicle that is capable of traveling the route carrying a projected payload. Such information may be accessed from vertiport information data store 240. As described above, the set of routes may comprise one or more additional routes to position an aerial vehicle at a predetermined vertiport after the aerial vehicle completes the set of routes. For example, the predetermined vertiport may be a vertiport at which the aerial vehicle can recharge/refuel, or it may be a vertiport at which the aerial vehicle is expected to begin a new set of generated routes. In another example, itinerary generation engine 245 assigns an aerial vehicle to a route without a corresponding payload (e.g., "deadheading"). In examples, such a route is used to position the aerial vehicle at a destination vertiport in anticipation of predicted demand, to perform vehicle maintenance, to refuel/recharge the aerial vehicle according to specific vehicle characteristics, etc.

Itinerary generation engine 245 may also generate an itinerary to transport a payload within the transportation network. In examples, such an itinerary is generated in response to an itinerary request, as may be received from a client device such as client devices 205, 210, or 215. According to aspects described herein, the itinerary request may comprise at least a starting location and a destination location for a payload. It will be appreciated that the starting location and the destination location need not each be vertiports and that, in some examples, multiple modes of transportation are used as described above. Examples of such aspects were discussed with respect to multimodal transportation system 100 in FIG. 1. As another example, itinerary generation engine 245 generates an itinerary based on an indication received from an aerial vehicle (e.g., processor 260 or processor 275 of aerial vehicle 225 or 230, respectively). Such aspects are discussed in greater detail below.

As described above, the itinerary comprises one or more routes and associated aerial vehicles. In examples, a pre-existing route that was generated by itinerary generation engine 245 is selected based on payload characteristics, route distance, route duration, and expected or actual demand for the route. In examples, at least some of such information is included in the itinerary request. In instances where a pre-existing route is used, an aerial vehicle (and, in some examples, one or more payloads) may already be associated with route, such that itinerary generation engine 245 evaluates payload characteristics based on vehicle characteristics of the associated aerial vehicle. For example, the evaluation comprises evaluating a payload weight as compared to the state of charge, state of health, and/or state of power for the aerial vehicle associated with the route. In other examples, itinerary generation engine 245 generates a new route for the payload (e.g., based on the received itinerary request) rather than using a pre-existing route. For example, the pre-existing route may not have capacity for the payload (e.g., due to volume restrictions, weight restrictions, etc.) or there may not be an existing route to transport the payload toward its destination.

In some examples, itineraries may be changed as a result of actual vehicle characteristics deviating from modeled characteristics (e.g., while traveling a route) or as a result of unexpected demand, among other examples. For example, vehicle characteristics received from processor 260 of aerial vehicle 225 or processor 275 of aerial vehicle 230 may indicate that modeled vehicle information is different than an actual state of charge, state of power, and/or state of health for the aerial vehicle. Accordingly, itinerary generation engine 245 may reassign a route to a different aerial vehicle, thereby generating an updated itinerary. As another example, an aerial vehicle may reject an assigned itinerary, thereby causing the itinerary to be reassigned and/or a new itinerary to be generated for the aerial vehicle.

In another example, itinerary generation engine 245 may determine to route an aerial vehicle to a different vertiport after completing its assigned route. For example, there may not be any suitable routes for the aerial vehicle as a result of a decreased state of charge, such that the new vertiport may enable the aerial vehicle to charge/refuel, pick up a payload that is better-suited for its current state of charge, or travel a route from that vertiport for which it is better-suited. Thus, itinerary generation engine 245 assigns aerial vehicles to one or more routes in order to optimize or otherwise improve one or more conditions, including, but not limited to, travel time, distance traveled, charge/refueling time, energy constraints, state of charge constraints, state of power constraints, and/or aerial vehicle downtime.

Figure 3A:
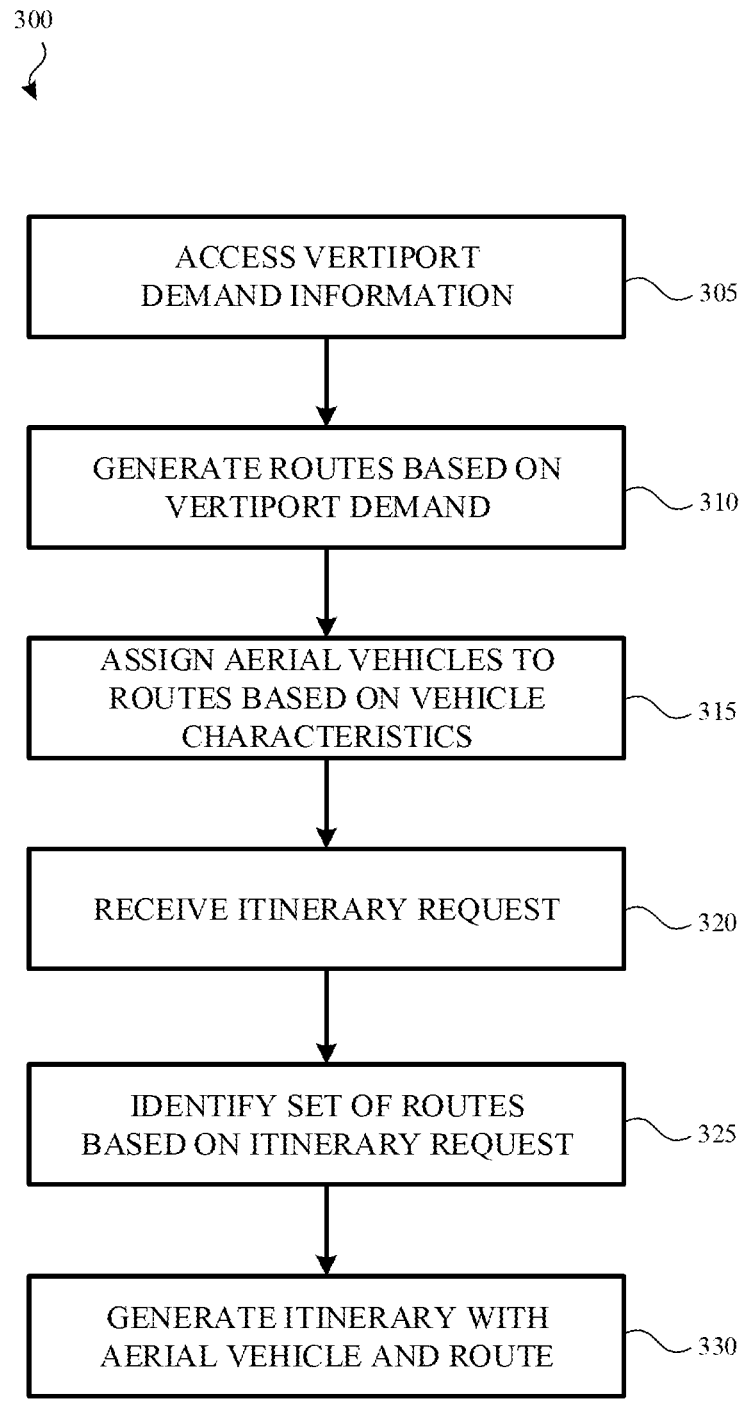
FIG. 3A illustrates an example method for generating a route for an aerial vehicle in a transportation network and determining an itinerary in response to an itinerary request.

FIG. 3A illustrates an example method 300 for generating a route for an aerial vehicle in a transportation network and determining an itinerary in response to an itinerary request. In examples, aspects of method 300 are performed by a transportation system in order to route payloads within a transportation network, such as transportation system 220 in FIG. 2 and multimodal transportation system 100 in FIG. 1. In some examples, aspects of method 300 are performed at regular intervals and/or upon the occurrence of certain events (e.g., in response to an itinerary request, based on an aerial vehicle accepting or rejecting an itinerary, etc.).

Method 300 begins at operation 305, where vertiport demand information is accessed. In examples, vertiport demand information is accessed from a vertiport information data store, such as vertiport information data store 240 in FIG. 2. Example vertiport demand information includes, but is not limited to, historical demand information for a given vertiport and/or vertiport pair and forecasted future demand (e.g., according to one or more models, based on one or more anticipated events, etc.).

Flow progresses to operation 310, where routes are generated according to the accessed demand information. As discussed above, a route comprises a departure vertiport and an arrival vertiport, which may be referred to as a vertiport pair. The route may be associated with a time or times, which are determined based on the demand information. In examples, the route further comprises information relating to historical and/or projected demand for one or more expected payload categories (e.g., riders, baggage, cargo, food, etc.), as may be determined according to the demand information accessed at operation 305.

As an example, a vertiport pair is identified between which a number of payloads were transported according to the historical data. In some examples, only vertiport pairs having demand above a predetermined threshold are identified. For example, the predetermined threshold may evaluate a number of payloads transported between a vertiport pair per day, per hour, or any of a variety of other time periods. As another example, demand information for a set of vertiports associated with a region is aggregated, such that routes are generated based on the assumption that vertiports within the set of vertiports are interchangeable and are each usable to service demand from the more generalized region. Thus, payloads may be routed to any of the vertiports in the set according to the multimodal transportation network disclosed herein. While example route generation techniques are described, it will be appreciated that any of a variety of techniques may be used in addition to or as an alternative to the techniques described herein.

At operation 315, aerial vehicles are assigned to the generated routes according to vehicle characteristics. As an example, an aerial vehicle is evaluated using one or more models (e.g., statistical model, machine-learned model, etc.) in view of available routes (e.g., as were generated at operation 310). For example, models relating to aerial vehicle energy type, state of charge, state of health, and/or state of power, among other vehicle characteristics, may be evaluated to generate predicted vehicle characteristics. In examples, a statistical model is specific to a type of aerial vehicle, wherein data for a set of aerial vehicles of a given type is processed to generate the type-specific model. Vehicle information used for such evaluations may be accessed from a vehicle information data store, such as vehicle information data store 235 in FIG. 2 discussed above.

In some instances, operation 315 further comprises evaluating the distance of the route, vertiport capabilities, and projected payload demand information based on the modeled vehicle characteristics in order to select an aerial vehicle that is capable of traveling the route carrying a projected payload. In examples, one or more additional routes are assigned to the aerial vehicle in order to position the aerial vehicle at a predetermined vertiport after the aerial vehicle completes its assigned set of routes. For example, the predetermined vertiport may be a vertiport at which the aerial vehicle can recharge/refuel, or it may be a vertiport at which the aerial vehicle is expected to begin a new set of generated routes.

Operation 315 may further comprise an evaluation of the state of charge and/or state of power of an aerial vehicle in order to maintain an energy budget. For example, an energy budget can include a state of charge threshold, such that the state of charge of the aerial vehicle is maintained above the threshold. As another example, the energy budget includes a state of power threshold, such that the state of power for the vehicle does not drop below the state of power threshold. Thus, an aerial vehicle may be assigned to a given route based on a determination that the aerial vehicle will have a predetermined state of charge and/or state of power upon arrival at the destination vertiport of the route. The threshold may be determined based on other (e.g., subsequent) routes assigned to the aerial vehicle (e.g., thereby ensuring the aerial vehicle has sufficient energy to complete the subsequent routes) and/or based on a minimum energy requirement in order to ensure the aerial vehicle is able to refuel at a given vertiport, among other examples.

Flow progresses to operation 320, where an itinerary request is received. For example, the itinerary request may be received from a client device such as client devices 205, 210, or 215 in FIG. 2. As described above, the itinerary request may comprise at least a starting location and a destination location for a payload. It will be appreciated that the starting location and the destination location need not each be vertiports and that, in some examples, multiple modes of transportation are used as described above. The itinerary request may further comprise one or more payload characteristics, including, but are not limited to, a payload type, a payload weight, a payload volume, a number of riders in a payload, a pick-up location, a drop-off location, and/or a distance to travel.

Moving to operation 325, a set of routes is identified based on the received itinerary request. As an example, a route generated at operation 310 is determined based on payload characteristics, route distance, route duration, and/or expected or actual demand for the route. The determination may further comprise evaluating payload characteristics based on vehicle characteristics of the aerial vehicle assigned to the route at operation 315. For example, the evaluation comprises evaluating a payload weight as compared to the state of charge, state of health, and/or state of power for the aerial vehicle. The evaluation may further comprise evaluating characteristics for additional payloads assigned to a route in view of the vehicle characteristics. It will be appreciated that the aerial vehicle may be at-capacity while, in other examples, excess capacity may exist depending on current demand or a planned future route for the aerial vehicle, among other examples.

Similar techniques may be used to add additional routes to the set of routes, such that multiple routes are chained together in order to transport a payload. Additionally, it will be appreciated that while operation 325 is described as using pre-existing routes, other examples may comprise generating a new route for the payload (e.g., as described above with respect to operations 305-315) in other examples.

At operation 330, an itinerary is generated comprising the set of routes and associated aerial vehicles. In examples, an indication of the generated itinerary is provided in response to the itinerary request received at operation 320 (e.g., to a client device). As another example, an indication of the generated itinerary is provided to an aerial vehicle, such as aerial vehicle 150, 225, and/or 230 in FIGS. 1 and 2. Flow terminates at operation 330.

FIG. 3B illustrates an example method 340 for assigning an itinerary to an aerial vehicle. In examples, aspects of method 340 are performed by a transportation system to route payloads within a transportation network, such as transportation system 220 in FIG. 2 and multimodal transportation system 100 in FIG. 1. Method 340 begins at operation 345, where an itinerary is generated for an aerial vehicle. In some examples, operation 345 comprises performing aspects of method 300 discussed above with respect to FIG. 3A.

Flow progresses to operation 350, where an indication of the itinerary is provided to the aerial vehicle for which it was generated. In examples, the indication comprises information relating to a route (e.g., a vertiport pair, a distance, vertiport characteristics, etc.) and information relating to one or more associated payloads. The indication may be provided to a processor of an aerial vehicle, such as processor 260 of aerial vehicle 225 or processor 275 of aerial vehicle 230 in FIG. 2. In another example, the indication may be provided to a provider application on a client device. While example indications are described herein, it will be appreciated that alternative, additional, or less information may be provided as part of the indication. For example, vertiport characteristics may be omitted, such that the aerial vehicle instead accesses such information from a vertiport information data store, such as vertiport information data store 240 in FIG. 2.

At operation 355, an indication is received from the aerial vehicle that indicates whether the aerial vehicle accepts or rejects the itinerary. In some examples, the indication comprises additional information relating to why the aerial vehicle has determined to accept or reject the itinerary. For example, the indication may comprise an estimated state of charge, state of power, or state of health after the aerial vehicle completes the itinerary. As another example, the indication comprises an indication of an energy/power excess or deficit, which may be used by the transportation system to revise one or more models or when generating subsequent itineraries, among other examples.

Accordingly, if it is indicated at 360 that the itinerary is not accepted by the aerial vehicle, flow branches "NO" to operation 365, where the itinerary is reassigned. In examples, itinerary reassignment comprises performing similar steps to those discussed above with respect to method 300 in FIG. 3A, where an aerial vehicle other than the aerial vehicle identified at operation 345 is identified. Accordingly, the itinerary is reassigned to the new aerial vehicle, and flow returns to operation 345 where a new itinerary is generated for the aerial vehicle accordingly. As noted above, the indication received at operation 355 may comprise information relating to why the itinerary was rejected, which may be used when generating the new itinerary. Flow progresses through operations 345, 340, 355, and 360 as described above.

However, if it is instead indicated that the itinerary is accepted by the aerial vehicle, flow branches "YES" to operation 370, where the itinerary associated with the aerial vehicle is stored. In examples, the itinerary is stored by a transportation system, such as transportation system 220 in FIG. 2. In some instances, operation 370 further comprises providing an indication to a client device (e.g., one or more of client devices 205, 210, or 215 in FIG. 2). Method 340 terminates at operation 370.

While method 340 and other aspects disclosed herein are described in examples where an aerial vehicle validates an itinerary to accept or reject the itinerary, it will be appreciated that, in other examples, a transportation system may validate an itinerary according to similar techniques as an alternative to or in addition to validation by an aerial vehicle. As an example, the transportation system may evaluate state of charge, state of power, and/or state of health to validate the itinerary in order to determine whether the itinerary is accepted or rejected on behalf of the aerial vehicle. If it is determined that the itinerary is rejected, the itinerary may be reassigned (e.g., as described with respect to operation 365) and a new itinerary may be generated (e.g., as described with respect to operation 345). In examples where it is determined that the itinerary is accepted, the itinerary may be associated with the aerial vehicle (e.g., as described with respect to operation 370).

FIG. 3C illustrates an example method 380 for validating an itinerary at an aerial vehicle. In examples, aspects of method 380 are performed by an aerial vehicle, such as processor 260 of aerial vehicle 225 or processor 275 of aerial vehicle 230 in FIG. 2. Method 380 starts at operation 382, where an indication of an itinerary is received. In examples, the indication is received from a transportation system, such as transportation system 220 in FIG. 2. The indication may be received from a transportation system performing operation 350 of method 340, discussed above with respect to FIG. 3B.

Flow progresses to operation 384, where the itinerary is evaluated based on a state of charge of the aerial vehicle. In examples, the state of charge is determined based at least in part on a vehicle state monitor, such as vehicle state monitor 250 or 265 in FIG. 2. In some examples, the state of charge for the aerial vehicle is estimated according to one or more statistical and/or machine learning models, among other examples. Accordingly, the energy requirement of the itinerary (e.g., as may be determined based on the distance of the route, the weight of the payload, current and/or forecasted weather conditions, etc.) is evaluated according to the current and/or estimated state of charge of the aerial vehicle in order to validate that the aerial vehicle is capable of performing the itinerary. The evaluation may further comprise evaluating the estimated state of charge of the aerial vehicle after performing the itinerary as compared to a predetermined threshold to confirm that the aerial vehicle maintains a certain energy budget (e.g., a minimum energy budget, a budget necessary to perform a subsequent itinerary, etc.).

At operation 386, the itinerary is evaluated based on a state of power of the aerial vehicle. In examples, the state of power is determined based at least in part on a vehicle state monitor, such as vehicle state monitor 250 or 265 in FIG. 2. In some examples, the state of power for the aerial vehicle is estimated according to one or more statistical and/or machine learning models, among other examples. Accordingly, the power requirement of the itinerary (e.g., as may be determined based on the distance of the route, the weight of the payload, current and/or forecasted weather conditions, etc.) is evaluated according to the current and/or estimated state of power of the aerial vehicle in order to validate that the aerial vehicle is capable of performing the itinerary. The evaluation may further comprise evaluating the estimated state of power of the aerial vehicle after performing the itinerary as compared to a predetermined threshold to confirm that the aerial vehicle maintains a certain power budget (e.g., a minimum power budget, a budget necessary to perform a subsequent itinerary, etc.).

Moving to operation 388, the itinerary is evaluated based on a state of health of the aerial vehicle. In examples, the state of health is determined based at least in part on a vehicle state monitor, such as vehicle state monitor 250 or 265 in FIG. 2. In some examples, the evaluation comprises estimating a state of health for the aerial vehicle according to one or more statistical and/or machine learning models, among other examples. For example, a state of health for the aerial vehicle may be estimated according to the itinerary in order to estimate the state of health of the vehicle during performance of or after completing the itinerary.

Flow progresses to operation 390, where a determination is generated to accept or reject the itinerary. In examples, the evaluations performed at operations 384, 836, and 388 are used as part of the determination. For example, each evaluation may generate a score, each of which may be combined according to a weighting such that the combined score is compared to a predetermined threshold. As another example, each evaluation may return a Boolean value (e.g., "yes"/"no," "true"/"false," etc.), such that the determination at operation 390 determines to accept the itinerary only if each of the three evaluations returns a "yes" or "true" value. In some instances, operation 390 comprises identifying one or more reasons that the itinerary is accepted or rejected. It will be appreciated that other techniques may be used to determine whether to accept the itinerary based on the evaluations.

At operation 392, an indication of the determination is provided to the transportation system (e.g., transportation system 220 in FIG. 2). In some examples, the indication comprises additional information relating to the determination to accept or reject the itinerary. For example, the indication may comprise an estimated state of charge, state of power, or state of health after the aerial vehicle completes the itinerary. As another example, the indication comprises an indication of an energy/power excess or deficit or an indication as to which evaluation(s) caused the itinerary to be accepted or rejected. Flow terminates at operation 392.

Figures 4A, 4B:
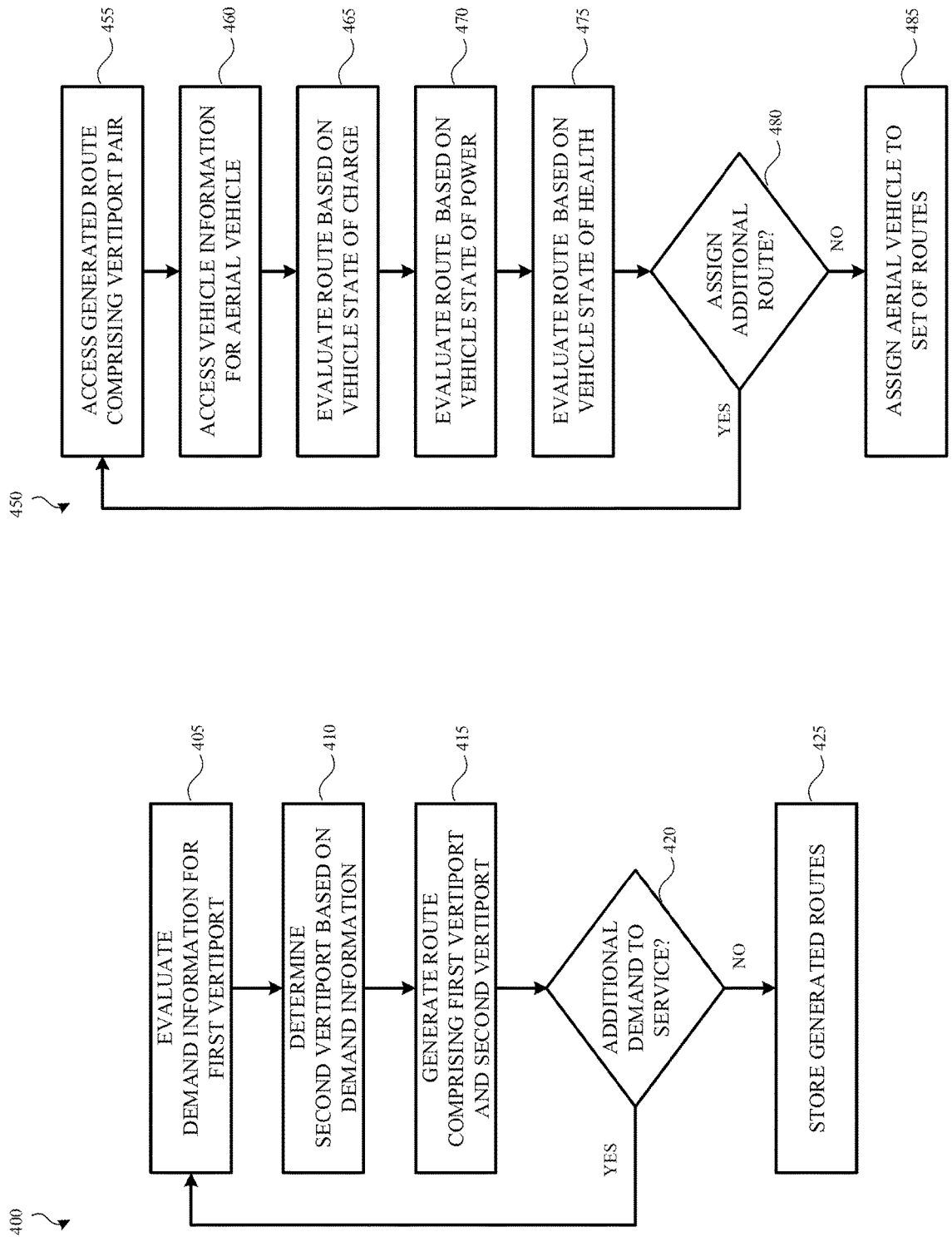
FIG. 4A illustrates an example method for generating a set of routes in a transportation network based on historic demand information.
FIG. 4B illustrates an example method for assigning an aerial vehicle to a route based on vehicle characteristics.

FIG. 4A illustrates an example method 400 for generating a set of routes in a transportation network based on historic demand information. In examples, aspects of method 400 are performed by a transportation system to route payloads within a transportation network, such as transportation system 220 in FIG. 2 and multimodal transportation system 100 in FIG. 1. In some examples, aspects of method 400 are performed at regular intervals and/or upon the occurrence of certain events (e.g., in response to an itinerary request, based on an aerial vehicle accepting or rejecting an itinerary, etc.). As another example, aspects of method 400 may be performed as part of operation 310 discussed above with respect to method 300 in FIG. 3A.

Method 400 begins at operation 405, where vertiport demand information is evaluated for a first vertiport. In examples, the vertiport demand information is accessed from a vertiport information data store, such as vertiport information data store 240 in FIG. 2. In some examples, the first vertiport is selected based on proximity to a given location, historical demand, and/or projected demand, among other information. In other examples, vertiports are processed according to method 400 iteratively, where each vertiport of a set of vertiports is evaluated according to the aspects described herein. Evaluating demand information of the first vertiport may comprise identifying one or more peak times of travel, estimating vertiport traffic according to a time of day and/or day of week, or evaluating one or more payload characteristics associated with the demand information, among other examples.

At operation 410, a second vertiport is determined based on the demand information. In examples, the vertiport is determined based on identifying a set of vertiports that are proximate to one or more of destination locations of the demand information. As an example, the identified peak times of travel, vertiport traffic, and/or payload characteristics associated with the first vertiport in operation 405 may be used to identify the second vertiport. For example, the second vertiport is a destination vertiport to which one or more payloads may be transported from the first vertiport. In some instances, the set of vertiports are ranked according to proximity to the destination locations, ability to service the historic or expected payload volume, types, or other payload characteristics indicated by the demand information, among other factors. Operation 410 may comprise an evaluation of vertiport characteristics associated with the second vertiport and/or the first vertiport. In examples, such characteristics may be accessed from a vertiport information data store, such as vertiport information data store 240.

Flow progresses to operation 415, where a route is generated comprising the first vertiport and the second vertiport. As described herein, the generated route comprises a departure vertiport (e.g., the first vertiport from operation 405) and an arrival vertiport (e.g., the second vertiport from operation 410). The route may be associated with a time or times and/or historical or projected demand for one or more payload categories, as may have been determined based on the demand information at operations 405 and/or 410.

While aspects of method 400 are described with respect to generating a route to service historical and/or projected demand, it will be appreciated that such techniques need not be used only to generate routes with which payloads are transported. Rather, as described above, a route may be generated for an aerial vehicle without transporting an associated payload (e.g., "deadheading"), thereby positioning the aerial vehicle at the destination vertiport to service demand and/or undergo maintenance, among other examples.

At determination 420, it is determined whether there is additional demand to address. The determination comprises evaluating the demand information in view of a set of generated routes to determine whether an additional route should be generated. For example, a predetermined threshold may be used, such that a route is generated if remaining demand in view of the set of routes exceeds the predetermined threshold. As another example, the set of routes is evaluated to determine whether an additional route needs to be generated in order to reposition an aerial vehicle in order to better service demand at a different vertiport. While example considerations are described, it will be appreciated that any of a variety of other considerations may be used in addition to or as an alternative to such examples.

If it is determined that there is additional demand to service, flow branches "YES," such that operations 405-420 are performed again as described above to generate an additional route. If, however, it is determined that there is not additional demand to service, flow instead branches "NO" to operation 425, where the routes generated according to operations 405-420 are stored. The set of routes may be stored by a transportation system (e.g., transportation system 220 in FIG. 2) and/or may be assigned to aerial vehicles and used to service demand within a transportation network according to aspects described herein. Flow terminates at operation 425.

FIG. 4B illustrates an example method 450 for assigning an aerial vehicle to a route based on vehicle characteristics. In examples, aspects of method 450 are performed by a transportation system to assign an aerial vehicle to a set of routes within a transportation network, such as transportation system 220 in FIG. 2 and multimodal transportation system 100 in FIG. 1. In some examples, aspects of method 450 are performed at regular intervals and/or upon the occurrence of certain events (e.g., in response to an itinerary request, based on an aerial vehicle accepting or rejecting an itinerary, based on a determination that an additional aerial vehicle is needed to service a given route, etc.). As another example, aspects of method 450 may be performed when assigning aerial vehicles to routes, as discussed above with respect to operation 315 of method 300 in FIG. 3A.

Method 450 starts at operation 455, where a generated route is accessed. As described above, the generated route comprises a vertiport pair having a starting vertiport and a destination vertiport, between which one or more payloads may be transported. In some examples, the route may be associated with a time or times, which are determined based on the demand information (e.g., as may have been generated according to method 400 in FIG. 4A). The route may further comprise information relating to historical and/or projected demand for one or more expected payload categories, among other payload characteristics.

At operation 460, aerial vehicle information is accessed. In examples, the aerial vehicle information is accessed from a vehicle information data store, such as vehicle information data store 235 in FIG. 2. As described above, the vehicle information may be provided by a manufacturer of the aerial vehicle and/or by the aerial vehicle itself, among other examples. Vehicle information includes, but is not limited to, general characteristics relating to a model of aerial vehicle. In other examples, vehicle information data store 235 comprises vehicle-specific characteristics for an aerial vehicle (e.g., aerial vehicle 225 and/or aerial vehicle 230 described above with respect to FIG. 2).

In some examples, aspects of method 450 are performed iteratively, where vehicle information for a specific vehicle is selected and evaluated according to the aspects described below. An aerial vehicle may be selected based on the route accessed at operation 455, for example based on a route distance, historical and/or projected demand, and/or one or more payload categories with the demand. In other examples, aspects of method 450 are performed on a set of aerial vehicles, such that the evaluations described below are performed for each aerial vehicle of the set. Aerial vehicles may then be ranked accordingly (e.g., based on a composite score of weighted factors, based on a single score, based on one or more logical rules, etc.), such that the highest-ranked aerial vehicle may be selected and assigned the route. It will be appreciated that a variety of other techniques may be used to select and evaluate an aerial vehicle according to aspects described herein.

Flow progresses to operation 465, where the route is evaluated according to the state of charge for the aerial vehicle. Accordingly, an energy requirement associated with the generated route (e.g., as may be determined based on the distance of the route, the weight of the historic/expected payload, current and/or forecasted weather conditions, etc.) is evaluated according to the vehicle information accessed at operation 460 to determine whether the aerial vehicle is capable of traveling the route. In some examples, the state of power for the aerial vehicle is estimated according to one or more statistical and/or machine learning models, among other examples. The evaluation may further comprise evaluating the estimated state of charge of the aerial vehicle after traveling the route as compared to a predetermined threshold to confirm that the aerial vehicle will maintain a certain energy budget.

At operation 470, the route is evaluated according to a state of power for the aerial vehicle. In examples, the vehicle information accessed at operation 460 comprises state of power that was determined at least in part by a vehicle state monitor, such as vehicle state monitor 250 or 265 in FIG. 2. In some examples, the state of power for the aerial vehicle is estimated according to one or more statistical and/or machine learning models, among other examples. Accordingly, the power requirement of the route is evaluated according to a current and/or estimated state of power of the aerial vehicle in order to validate that the aerial vehicle is capable of traveling the route. The evaluation may further comprise evaluating the estimated state of power of the aerial vehicle after traveling the route as compared to a predetermined threshold to confirm that the aerial vehicle maintains a certain power budget (e.g., a minimum power budget, a budget necessary to perform a subsequent itinerary, etc.).

Moving to operation 475, the route is evaluated based on a state of health for the aerial vehicle. As an example, the state of health is part of the vehicle information accessed at operation 460 and may have been determined based at least in part on a vehicle state monitor, such as vehicle state monitor 250 or 265 in FIG. 2. In some examples, the evaluation comprises estimating a state of health for the aerial vehicle according to one or more statistical and/or machine learning models, among other examples. For example, a state of health for the aerial vehicle may be estimated according to the route in order to estimate the state of health of the vehicle during performance of or after traveling the route.

At determination 480, it is determined whether to assign an additional route to the aerial vehicle. In examples, the determination comprises evaluating a predicted state of charge, predicted state of power, and/or predicted state of health associated with the vehicle as compared to one or more predetermined thresholds (e.g., an energy budget, a power budget, etc.) to determine whether the aerial vehicle is usable to travel an additional route after the accessed route. Such techniques may be applied to a set of routes, where each route of the set is evaluated to determine whether any route is a candidate subsequent route for the aerial vehicle. As another example, predicted and/or historical demand information may be evaluated based on other aerial vehicles of the transportation network to determine whether the aerial vehicle is underutilized as compared to other aerial vehicles. For example, a target or threshold utilization rate may be used (e.g., percentage of time spent in-service versus out-of-service, assigned payload weight and/or volume versus available unloaded payload capacity, etc.) in order to spread routes more evenly across aerial vehicles of the transportation network. In other examples, determination 480 comprises determining that there are no other aerial vehicles available to which subsequent routes can be assigned.

If, at determination 480, it is determined to assign an additional route to the aerial vehicle, flow branches "YES" to operations 455-475 where another route is accessed, evaluated, and assigned to the aerial vehicle as described above. In examples, a route is accessed based on determining that a starting vertiport of the route is a destination vertiport of a previously assigned route. As another example, the route is accessed based on determining that an arrival vertiport of the new route is the same as the departure vertiport of the previously assigned route. As such, the routes may be reordered, thereby generating a set of routes in which the new route is traveled by the aerial vehicle prior to the previously assigned route. In other examples, a route having a different starting vertiport than a destination vertiport of a previously assigned route may be evaluated, such that the aerial vehicle may deadhead to the subsequent starting vertiport.

However, if it is determined not to assign an additional route, flow instead branches "NO" to operation 485, where the set of routes are assigned to the aerial vehicle. In examples, assigning the set of routes comprises generating an association between the aerial vehicle and each route of the set. The association may indicate one or more dates and/or times for which the aerial vehicle is assigned the route or may more generally associate the aerial vehicle with the route such that the aerial vehicle is assigned to all instances of the route regardless of a specific date and/or time. Flow terminates at operation 485.

Figure 5:
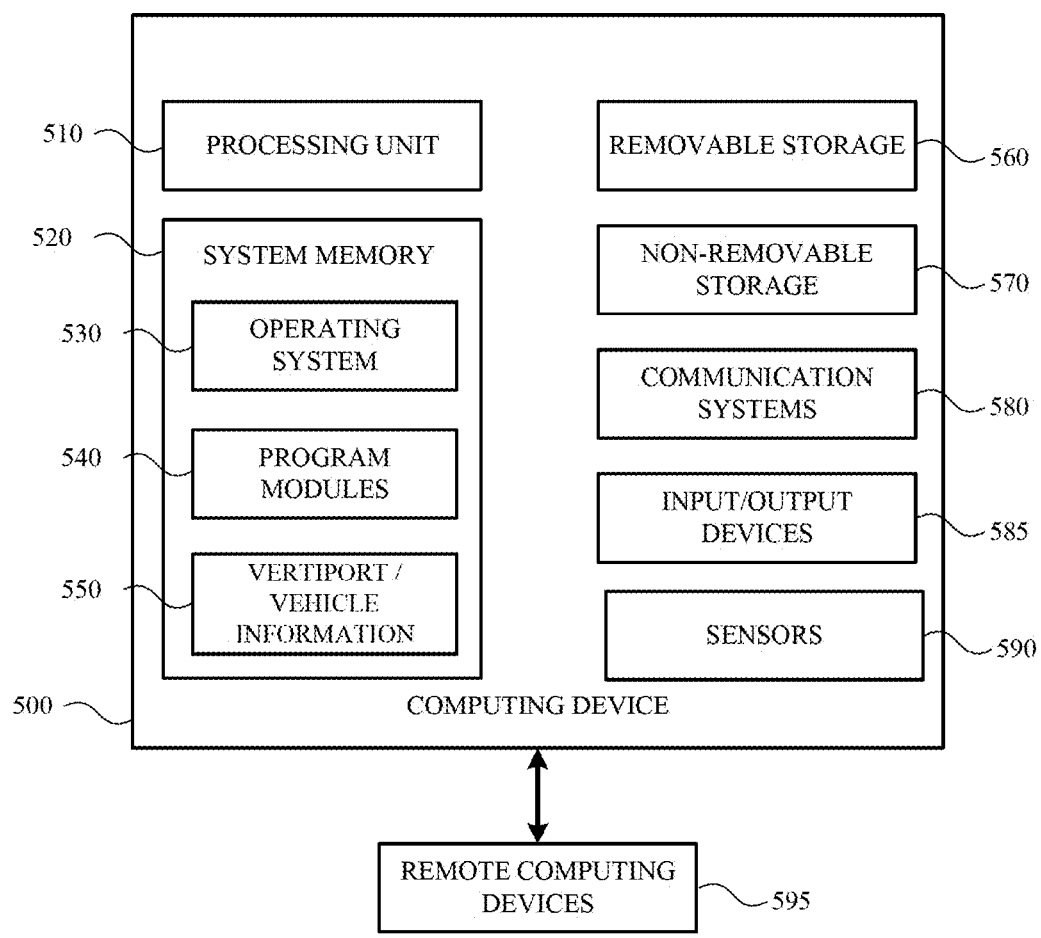
FIG. 5 illustrates an example computing device with which aspects of the present disclosure may be practiced.

FIG. 5 illustrates an example computing device 500 with which aspects of the present disclosure may be practiced. The computing device 500 may be integrated with or associated with an aerial vehicle, such as aerial vehicle 150 and/or aerial vehicles 225 and 230 discussed above with respect to FIGS. 1 and 2, respectively. Additionally, a computing device 500 may be integrated or otherwise associated with various systems shown and described with respect to FIGS. 1 and 2. As shown in FIG. 5, the physical components (e.g., hardware) of the computing are illustrated and these physical components may be used to practice the various aspects of the present disclosure.

The computing device 500 may include at least one processing unit 510 and a system memory 520 or memory resource. The system memory 520 or memory resource may include, but is not limited to, volatile storage (e.g., random access memory), non-volatile storage (e.g., read-only memory), flash memory, or any combination of such memories. The system memory 520 may also include an operating system 530 that control the operation of the computing device 500 and one or more program modules 540. The program modules 540 may be responsible for gathering, receiving and/or determining vertiport/vehicle information 550 and/or generating routes and/or itineraries as described above. The system memory 520 may also store this information or otherwise provide access to this information. A number of different program modules and data files may be stored in the system memory 520. While executing on the processing unit 510, the program modules 540 may perform the various operations described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 500 may include one or more communication systems 580 that enable communication with and/or among client devices, aerial vehicles, a transportation system, other computing devices 595, a network service and the like. Examples of communication systems 580 include, but are not limited to, radio frequency (RF) transmitter, receiver, and/or transceiver circuitry, a Controller Area Network (CAN) bus, a universal serial bus (USB), parallel, and/or serial ports.

The computing device 500 may also have one or more input devices and/or one or more output devices shown as input/output devices 585. These input/output devices 585 may include a keyboard, a sound or voice input device, haptic devices, a touch, force and/or swipe input device, a display, speakers, etc. The aforementioned devices are examples and others may be used.

The computing device 500 may also include one or more sensors 590. The sensors may be used to detect or otherwise provide information about the operating condition of the light electric vehicle, a rechargeable battery and/or a rechargeable battery kiosk. In other examples, the sensors 590 may provide information about a light electric vehicle to which the computing device 500 is associated. For example, the sensors 590 may include a heat sensor, a charge sensor or other such rechargeable battery sensors.

The term computer-readable media as used herein may include computer storage media.

Computer storage media may include volatile and non-volatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As will be understood from the foregoing disclosure, one aspect of the technology relates to a method for determining an aerial vehicle and route to transport a payload within a transportation network. The method comprises: generating a set of available routes in the transportation network based on historical demand information, wherein each route comprises a departure vertiport and an arrival vertiport; accessing, for a set of aerial vehicles of the transportation network, a set of vehicle characteristics for each aerial vehicle of the set of aerial vehicles, wherein the set of vehicle characteristics comprises at least one of: an energy type of the aerial vehicle; a state of charge of the aerial vehicle; a state of power of the aerial vehicle; or a state of health of the aerial vehicle; accessing capability information for each vertiport of a route in the set of available routes; and assigning, based on the set of vehicle characteristics and the capability information, an aerial vehicle from the set of aerial vehicles to the route. In an example, the method further comprises generating, using a model for a type of the assigned aerial vehicle, at least one predicted vehicle characteristic of the set of vehicle characteristics for the assigned aerial vehicle. In a further example, the at least one predicted vehicle characteristic is one of a predicted state of charge, a predicted state of power, or a predicted state of health at the arrival vertiport. In yet another example, the predicted vehicle characteristic is a predicted state of charge, and the method further comprises: receiving a state of charge indication from the assigned aerial vehicle that is different than the predicted state of charge; identifying a subsequent route assigned to the assigned aerial vehicle; and based on the received state of charge indication, assigning a new aerial vehicle to the subsequent route instead of the assigned aerial vehicle. In a further still example, the route is a first route of a set of routes for the assigned aerial vehicle, and the method further comprises: determining a second route for the aerial vehicle comprising an arrival vertiport that is the same as a departure vertiport of the first route; assigning the second route to the aerial vehicle; and reordering the set of routes for the assigned aerial vehicle to travel the second route prior to traveling the first route. In an example, the route is a first route, and the method further comprises: receiving an itinerary request associated with a payload comprising payload characteristics; determining that a new route is to be generated based on the payload characteristics instead of using the first route to transport the payload; generating the new route comprising a new departure vertiport and a new arrival vertiport based on the payload characteristics; determining a new aerial vehicle for the new route based on the payload characteristics, a vehicle characteristic for the new aerial vehicle, and capability information associated with the new arrival vertiport; and generating an itinerary in response to the itinerary request comprising information associated with the new route and the new aerial vehicle. In another example, the method further comprises: receiving an itinerary request associated with a payload comprising payload characteristics; evaluating the payload characteristics, the route, and the assigned aerial vehicle to determine that the route is to be used to transport the payload; and generating an itinerary comprising information associated with the route and the assigned aerial vehicle. In a further example, assigning the aerial vehicle to the route further comprises evaluating a predicted amount of time for the assigned aerial vehicle to reach a predetermined state of charge at the arrival vertiport.

In another aspect, the technology relates to a method for validating an itinerary to transport a payload using an aerial vehicle within a transportation network. The method comprises: receiving, from a transportation system, an itinerary comprising a starting vertiport, a destination vertiport, and an indication of a payload; accessing a set of vehicle characteristics for the aerial vehicle, comprising at least one of: an energy type of the aerial vehicle; a state of charge of the aerial vehicle; a state of power of the aerial vehicle; or a state of health of the aerial vehicle; evaluating the set of vehicle characteristics based at least in part on the starting vertiport, the destination vertiport, and the payload to validate whether the aerial vehicle is capable of performing the itinerary; and providing, to the transportation system, an indication to either accept the itinerary or reject the itinerary based on validating whether the aerial vehicle is capable of performing the itinerary. In an example, an indication to reject the itinerary is provided to the transportation system, and the method further comprises: receiving, from the transportation system, a second itinerary; and evaluating the set of vehicle characteristics to validate the second itinerary. In another example, evaluating the set of vehicle characteristics to validate whether the aerial vehicle is capable of performing the itinerary further comprises: generating a display comprising a vehicle status indication based on evaluating the set of vehicle characteristics; and receiving input via the display accepting or rejecting the itinerary. In a further example, the set of vehicle characteristics are accessed at least in part from a vehicle state monitor of the aerial vehicle.

In a further aspect, the technology relates to a system comprising: at least one processor; and memory, operatively connected to the at least one processor and storing instructions that, when executed by the at least one processor, cause the system to perform a set of operations. The set of operations comprises: generating a set of available routes in the transportation network based on historical demand information, wherein each route comprises a departure vertiport and an arrival vertiport; accessing, for a set of aerial vehicles of the transportation network, a set of vehicle characteristics for each aerial vehicle of the set of aerial vehicles, wherein the set of vehicle characteristics comprises at least one of: an energy type of the aerial vehicle; a state of charge of the aerial vehicle; a state of power of the aerial vehicle; or a state of health of the aerial vehicle; accessing capability information for each vertiport of a route in the set of available routes; and assigning, based on the set of vehicle characteristics and the capability information, an aerial vehicle from the set of aerial vehicles to the route. In an example, the set of operations further comprises: generating, using a model for a type of the assigned aerial vehicle, at least one predicted vehicle characteristic of the set of vehicle characteristics. In another example, the at least one predicted vehicle characteristic is one of a predicted state of charge, a predicted state of power, or a predicted state of health at the arrival vertiport. In a further example, the predicted vehicle characteristic is a predicted state of charge, and the set of operations further comprises: receiving a state of charge indication from the assigned aerial vehicle that is different than the predicted state of charge; identifying a subsequent route assigned to the aerial vehicle; and based on the received state of charge indication, assigning a new aerial vehicle to the subsequent route instead of the assigned aerial vehicle. In yet another example, the route is a first route of a set of routes for the assigned aerial vehicle, and the set of operations further comprises: determining a second route for the aerial vehicle comprising an arrival vertiport that is the same as a departure vertiport of the first route; assigning the second route to the aerial vehicle; and reordering the set of routes for the assigned aerial vehicle to travel the second route prior to traveling the first route. In a further still example, the set of operations further comprises: receiving an itinerary request associated with a payload comprising payload characteristics; determining that a new route is to be generated based on the payload characteristics instead of using the first route to transport the payload; generating the new route comprising a new departure vertiport and a new arrival vertiport based on the payload characteristics; determining a new aerial vehicle for the new route based on the payload characteristics, a vehicle characteristic for the new aerial vehicle, and capability information associated with the new arrival vertiport; and generating an itinerary in response to the itinerary request comprising information associated with the new route and new aerial vehicle. In an example, the set of operations further comprises: receiving an itinerary request associated with a payload comprising payload characteristics; evaluating the payload characteristics, the route, and the assigned aerial vehicle to determine that the route is to be used to transport the payload; and generating an itinerary comprising information associated with the route and the assigned aerial vehicle. In another example, assigning the aerial vehicle to the route further comprises evaluating a predicted amount of time for the assigned aerial vehicle to reach a predetermined state of charge at the arrival vertiport.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for determining an aerial vehicle and route to transport a payload comprising one or more passengers within a transportation network, comprising:
   generating a set of available routes in the transportation network based on historical demand information, wherein each route comprises a departure vertiport and an arrival vertiport;
   accessing, for a set of aerial vehicles of the transportation network, a set of vehicle characteristics for each aerial vehicle of the set of aerial vehicles, wherein the set of vehicle characteristics comprises:
      a state of charge of the aerial vehicle;
      a state of power of the aerial vehicle; and
      a state of health of the aerial vehicle;
   receiving an itinerary request associated with aerial transport of the one or more passengers, the itinerary request comprising payload characteristics, the payload characteristics comprising a quantity of the one or more passengers in the payload;

accessing capability information for each vertiport of a route in the set of available routes;

assigning, based on the set of vehicle characteristics, the payload characteristics including the quantity of the one or more passengers in the payload, and the capability information, an aerial vehicle from the set of aerial vehicles to the route, wherein the aerial vehicle is assigned based on a determination that the aerial vehicle will maintain an energy budget above a threshold upon arrival at the arrival vertiport, the energy budget based on at least one of the state of charge of the aerial vehicle or the state of power of the aerial vehicle;

generating, using a machine-learned model for a type of the assigned aerial vehicle, a predicted state of charge for the assigned aerial vehicle;

receiving a state of charge indication from a sensor of the assigned aerial vehicle that is different than the predicted state of charge;

identifying a subsequent route assigned to the assigned aerial vehicle; and based on the received state of charge indication, assigning a new aerial vehicle to the subsequent route instead of the assigned aerial vehicle.

2. The method of claim 1, further comprising:
generating an itinerary comprising information associated with the subsequent route and the new aerial vehicle.

3. The method of claim 1, further comprising:
receiving an indication from the assigned aerial vehicle rejecting the route; and
based on the indication from the assigned aerial vehicle rejecting the route, assigning a new aerial vehicle to the subsequent route instead of the assigned aerial vehicle.

4. The method of claim 1, further comprising:
determining to route the assigned aerial vehicle to a different vertiport than a vertiport associated with the subsequent route after completing the route.

5. The method of claim 1, wherein the route is a first route of a set of routes for the assigned aerial vehicle, and further comprising:
determining a second route for the aerial vehicle comprising an arrival vertiport that is the same as a departure vertiport of the first route;
assigning the second route to the aerial vehicle; and
reordering the set of routes for the assigned aerial vehicle to travel the second route prior to traveling the first route.

6. The method of claim 1, wherein the route is a first route, and further comprising:
determining that a new route is to be generated based on the payload characteristics instead of using the first route to transport the one or more passengers;
generating the new route comprising a new departure vertiport and a new arrival vertiport based on the payload characteristics;
determining a new aerial vehicle for the new route based on the payload characteristics, a vehicle characteristic for the new aerial vehicle, and capability information associated with the new arrival vertiport; and
generating an itinerary in response to the itinerary request comprising information associated with the new route and the new aerial vehicle.

7. The method of claim 1, further comprising:
evaluating the payload characteristics, the route, and the assigned aerial vehicle to determine that the route is to be used to transport the one or more passengers; and
generating an itinerary comprising information associated with the route and the assigned aerial vehicle.

8. The method of claim 1, wherein assigning the aerial vehicle to the route further comprises evaluating a predicted amount of time for the assigned aerial vehicle to reach a predetermined state of charge at the arrival vertiport.

9. A method for validating an itinerary to transport one or more passengers using an aerial vehicle within a transportation network, comprising:
receiving, from a transportation system, an itinerary comprising a starting vertiport, a destination vertiport, and an indication of the one or more passengers;
accessing a set of vehicle characteristics for the aerial vehicle, comprising:
an energy type of the aerial vehicle;
a state of charge of the aerial vehicle;
a state of power of the aerial vehicle; and
a state of health of the aerial vehicle;
receiving an itinerary request associated with aerial transport of the one or more passengers, the itinerary request comprising payload characteristics, the payload characteristics comprising a quantity of the one or more passengers in the payload;
providing the set of vehicle characteristics, the starting vertiport, the destination vertiport, and payload characteristics including the quantity of the one or more passengers associated with the one or more passengers to a machine-learned model configured to validate whether the aerial vehicle is capable of performing the itinerary and whether the aerial vehicle will maintain an energy budget above a threshold upon arrival at the destination vertiport, the energy budget being based on at least one of the state of charge of the aerial vehicle or the state of power of the aerial vehicle; and
providing, to the transportation system, an indication to either accept the itinerary or reject the itinerary based on validating whether the aerial vehicle is capable of performing the itinerary and whether the aerial vehicle will maintain the energy budget above the threshold.

10. The method of claim 9, wherein an indication to reject the itinerary is provided to the transportation system, and further comprising:
receiving, from the transportation system, a second itinerary; and
evaluating the set of vehicle characteristics to validate the second itinerary.

11. The method of claim 9, wherein evaluating the set of vehicle characteristics to validate whether the aerial vehicle is capable of performing the itinerary further comprises:
generating a display comprising a vehicle status indication based on evaluating the set of vehicle characteristics; and
receiving input via the display accepting or rejecting the itinerary.

12. The method of claim 9, wherein the set of vehicle characteristics are accessed at least in part from a vehicle state monitor of the aerial vehicle.

13. A system for determining an aerial vehicle and route to transport a payload comprising one or more passengers within a transportation network, comprising:
at least one processor; and
memory, operatively connected to the at least one processor and storing instructions that, when executed by the at least one processor, cause the system to perform a set of operations comprising:

generating a set of available routes in a transportation network based on historical demand information, wherein each route comprises a departure vertiport and an arrival vertiport;

accessing, for a set of aerial vehicles of the transportation network, a set of vehicle characteristics for each aerial vehicle of the set of aerial vehicles, wherein the set of vehicle characteristics comprises:
a state of charge of the aerial vehicle;
a state of power of the aerial vehicle; and
a state of health of the aerial vehicle;

receiving an itinerary request associated with aerial transport of the one or more passengers, the itinerary request comprising payload characteristics, the payload characteristics comprising a quantity of the one or more passengers in the payload;

accessing capability information for each vertiport of a route in the set of available routes;

assigning, based on the set of vehicle characteristics, the payload characteristics including the quantity of the one or more passengers in the payload, and the capability information, an aerial vehicle from the set of aerial vehicles to the route, wherein the aerial vehicle is assigned based on a determination that the aerial vehicle will maintain an energy budget above a threshold upon arrival at the arrival vertiport, the energy budget based on at least one of the state of charge of the aerial vehicle or the state of power of the aerial vehicle; and generating, using a machine-learned model for a type of the assigned aerial vehicle, a predicted state of charge for the assigned aerial vehicle;

receiving a state of charge indication from a sensor of the assigned aerial vehicle that is different than the predicted state of charge;

identifying a subsequent route assigned to the assigned aerial vehicle; and based on the received state of charge indication, assigning a new aerial vehicle to the subsequent route instead of the assigned aerial vehicle.

14. The system of claim 13, wherein the set of operations further comprises:
generating an itinerary comprising information associated with the subsequent route and the new aerial vehicle.

15. The system of claim 13, wherein the set of operations further comprises:

receiving an indication from the assigned aerial vehicle rejecting the route; and based on the indication from the assigned aerial vehicle rejecting the route, assigning a new aerial vehicle to the subsequent route instead of the assigned aerial vehicle.

16. The system of claim 13, wherein the set of operations further comprises:
determining to route the assigned aerial vehicle to a different vertiport than a vertiport associated with the subsequent route after completing the route.

17. The system of claim 13, wherein the route is a first route of a set of routes for the assigned aerial vehicle, and the set of operations further comprises:
determining a second route for the aerial vehicle comprising an arrival vertiport that is the same as a departure vertiport of the first route;
assigning the second route to the aerial vehicle; and
reordering the set of routes for the assigned aerial vehicle to travel the second route prior to traveling the first route.

18. The system of claim 13, wherein the route is a first route of a set of routes for the assigned aerial vehicle, and the set of operations further comprises:
determining that a new route is to be generated based on the payload characteristics instead of using the first route to transport the one or more passengers;
generating the new route comprising a new departure vertiport and a new arrival vertiport based on the payload characteristics;
determining a new aerial vehicle for the new route based on the payload characteristics, a vehicle characteristic for the new aerial vehicle, and capability information associated with the new arrival vertiport; and
generating an itinerary in response to the itinerary request comprising information associated with the new route and new aerial vehicle.

19. The system of claim 13, wherein the set of operations further comprises:
evaluating the payload characteristics, the route, and the assigned aerial vehicle to determine that the route is to be used to transport the one or more passengers; and
generating an itinerary comprising information associated with the route and the assigned aerial vehicle.

20. The system of claim 13, wherein assigning the aerial vehicle to the route further comprises evaluating a predicted amount of time for the assigned aerial vehicle to reach a predetermined state of charge at the arrival vertiport.

* * * * *